(12) United States Patent
Hu

(10) Patent No.: US 11,132,523 B2
(45) Date of Patent: *Sep. 28, 2021

(54) METHOD AND APPARATUS FOR FINGERPRINT IDENTIFICATION AND ELECTRONIC DEVICE

(71) Applicant: SHENZHEN GOODIX TECHNOLOGY CO., LTD., Shenzhen (CN)

(72) Inventor: Rongying Hu, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/833,472

(22) Filed: Mar. 27, 2020

(65) Prior Publication Data

US 2020/0364432 A1   Nov. 19, 2020

Related U.S. Application Data

(63) Continuation of application No. PCT/CN2019/087107, filed on May 15, 2019.

(51) Int. Cl.
   *G06K 9/28* (2006.01)
   *G06K 9/00* (2006.01)
   *G06F 21/32* (2013.01)

(52) U.S. Cl.
   CPC .......... *G06K 9/0002* (2013.01); *G06F 21/32* (2013.01)

(58) Field of Classification Search
   CPC .......... G06K 9/00067; G06K 9/00006–9/0012
   See application file for complete search history.

(56) References Cited

U.S. PATENT DOCUMENTS

| 2014/0294260 | A1* | 10/2014 | Kim | G06K 9/0002 |
| | | | | 382/124 |
| 2017/0206392 | A1* | 7/2017 | Zhu | G06K 9/0002 |
| 2018/0373920 | A1* | 12/2018 | Shi | G06K 9/0002 |
| 2019/0095079 | A1 | 3/2019 | Deotale et al. | |
| 2020/0210065 | A1* | 7/2020 | Chen | G06K 9/2081 |

FOREIGN PATENT DOCUMENTS

| CN | 108323195 A | 7/2018 |
| CN | 109313522 A | 2/2019 |
| CN | 109416739 A | 3/2019 |
| CN | 109753852 A | 5/2019 |
| WO | 2019054796 A1 | 3/2019 |

* cited by examiner

*Primary Examiner* — Brian Werner

(57) ABSTRACT

Provided are a method and apparatus for fingerprint identification and an electronic device, which could increase a speed of fingerprint identification. The method is applied to an electronic device including M fingerprint sensors, and the method includes: acquiring pressing information of a finger in a fingerprint detecting region; determining a target sub-region among N sub-regions according to the pressing information, where the N sub-regions cover the fingerprint detecting region, M and N are positive integers greater than 1, and N>M; and determining a data acquiring region according to the target sub-region, where fingerprint data in the data acquiring region is used for fingerprint identification.

20 Claims, 15 Drawing Sheets

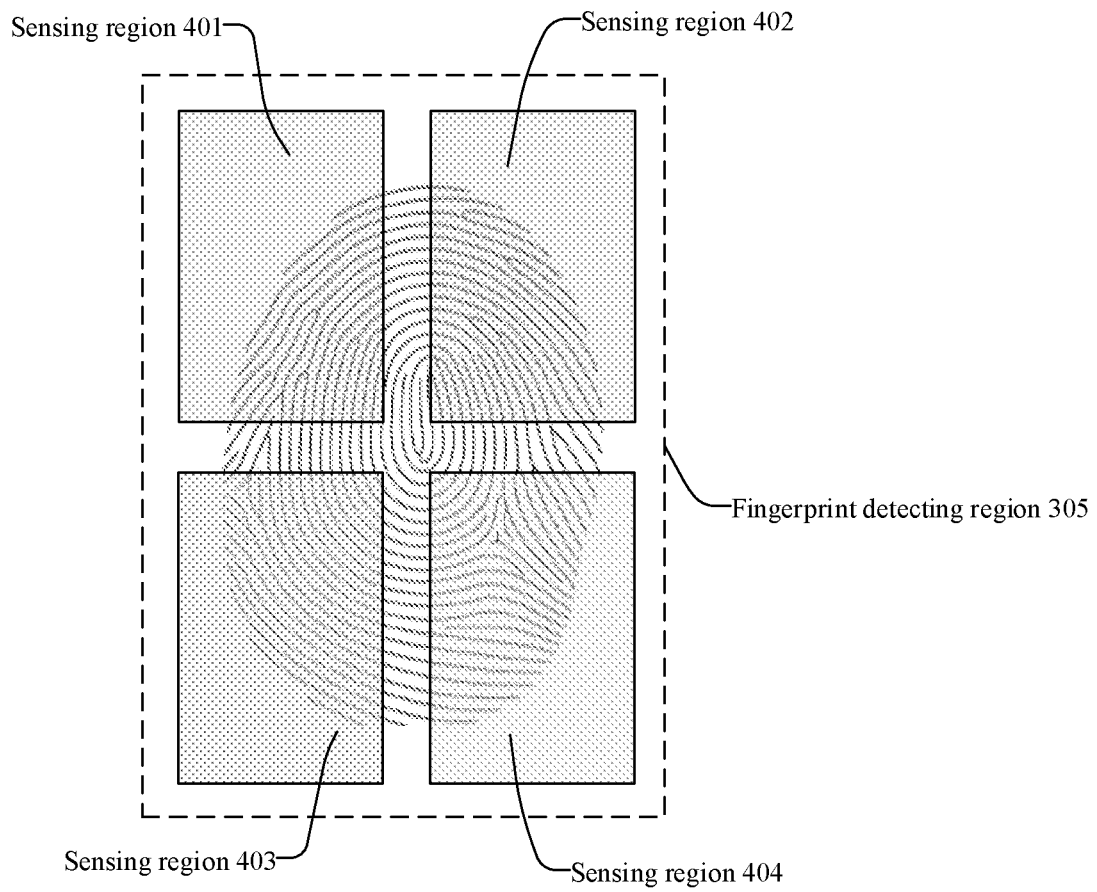

Acquiring pressing information of a finger in a fingerprint detecting region, where the data acquiring region is determined according to a target sub-region of N sub-regions, the N sub-regions cover the fingerprint detecting region, M and N are positive integers and N > M, and the target sub-region is determined according to the pressing information of the finger in the fingerprint detecting region. The fingerprint data in the data acquiring region is used to fingerprint identification

METHOD AND APPARATUS FOR FINGERPRINT IDENTIFICATION AND ELECTRONIC DEVICE

CROSS-REFERENCE TO RELATED APPLICATIONS

This application is a continuation of International Application No. PCT/CN2019/087107, filed on May 15, 2019, the disclosure of which is hereby incorporated by reference in its entirety.

TECHNICAL FIELD

Embodiments of the present application relate to the field of biometric identification, and more particularly, to a method and apparatus for fingerprint identification and an electronic device.

BACKGROUND

An under-screen fingerprint identification apparatus may be disposed under a display screen in a mobile phone without having to be limited by a specific size, and can implement fingerprint identification of a large area, which is equivalent to increasing a length of fingerprint passwords and improving security of the fingerprint identification. However, the fingerprint identification of a large area requires longer time to process fingerprint data, which affects a speed of the fingerprint identification and thus affects user experience.

SUMMARY

Embodiments of the present application provide a method and apparatus for fingerprint identification and an electronic device, which could increase a speed of the fingerprint identification.

In a first aspect, provided is a method for fingerprint identification, where the method is applied to an electronic device including M fingerprint sensors, where each fingerprint sensor corresponds to one sensing region, sensing regions of the M fingerprint sensors constitute a fingerprint detecting region of the electronic device, and the method includes:

acquiring fingerprint data in a data acquiring region, where the data acquiring region is determined according to a target sub-region of N sub-regions, the N sub-regions cover the fingerprint detecting region, M and N are positive integers and N>M, the target sub-region is determined according to pressing information of a finger in the fingerprint detecting region, and the fingerprint data in the data acquiring region is used for fingerprint identification.

In a possible implementation manner, the N sub-regions include a sub-region that at least partially overlaps with a sensing region of only one fingerprint sensor, and a sub-region that at least partially overlaps with sensing regions of a plurality of fingerprint sensors.

In a possible implementation manner, the pressing information includes a center of gravity of pressing of the finger, and the target sub-region is a region where the center of gravity of pressing is located.

In a possible implementation manner, an area of the data acquiring region is equal to an area of a sensing region of one fingerprint sensor.

In a possible implementation manner, when the target sub-region at least partially overlaps with a sensing region of only one fingerprint sensor, at least one fingerprint sensor acquiring the fingerprint data is the fingerprint sensor whose sensing region overlaps with the target sub-region, and the data acquiring region is the sensing region of the fingerprint sensor.

In a possible implementation manner, when the target sub-region at least partially overlaps with sensing regions of a plurality of fingerprint sensors, at least one fingerprint sensor acquiring the fingerprint data is the plurality of fingerprint sensors whose sensing regions overlap with the target sub-region, and the data acquiring region is constituted by parts of the respective sensing regions of the plurality of fingerprint sensors.

In a possible implementation manner, when the target sub-region at least partially overlaps with sensing regions of K adjacent fingerprint sensor, the data acquiring region includes 1/K of each of the sensing regions of the K fingerprint sensors, K≤M.

In a possible implementation manner, the N sub-regions do not overlap with each other.

In a possible implementation manner, the M fingerprint sensors are arranged in a single row or in an array.

In a possible implementation manner, when the M fingerprint sensors are arranged in a single row, the N sub-regions are arranged in a single row, N=2M−1, where the 2i+1-th sub-region covers sensing regions of respective edge portions of two adjacent fingerprint sensors, and the 2i-th sub-region only covers a sensing region of a middle portion of one fingerprint sensor, 1≤i≤(N−1)/2.

In a possible implementation manner, when the M fingerprint sensors include m rows×n columns of fingerprint sensors, the N sub-regions include (m+1) rows×(n+1) columns of sub-regions, where sub-regions in the first and last rows and the first and last columns of the N sub-regions cover a sensing region of an edge portion of one fingerprint sensor or sensing regions of respective edge portions of two adjacent fingerprint sensors, and sub-regions other than the sub-regions in the first and last rows and the first and last columns cover sensing regions of respective edge portions of four adjacent fingerprint sensors.

In a second aspect, provided is an apparatus for fingerprint identification, where the apparatus includes M fingerprint sensors, where each fingerprint sensor corresponds to one sensing region, and sensing regions of the M fingerprint sensors constitute a fingerprint detecting region of the apparatus, where at least one fingerprint sensor of the M fingerprint sensors is configured to acquire fingerprint data in a data acquiring region, where the data acquiring region is determined according to a target sub-region of N sub-regions, the N sub-regions cover the fingerprint detecting region, M and N are positive integers and N>M, the target sub-region is determined according to pressing information of a finger in the fingerprint detecting region, and the fingerprint data in the data acquiring region is used for fingerprint identification.

In a possible implementation manner, the N sub-regions include a sub-region that at least partially overlaps with a sensing region of only one fingerprint sensor, and a sub-region that at least partially overlaps with sensing regions of a plurality of fingerprint sensors.

In a possible implementation manner, the pressing information includes a center of gravity of pressing of the finger, and the target sub-region is a region where the center of gravity of pressing is located.

In a possible implementation manner, an area of the data acquiring region is equal to an area of a sensing region of one fingerprint sensor.

In a possible implementation manner, when the target sub-region at least partially overlaps with a sensing region of only one fingerprint sensor, the at least one fingerprint sensor is the fingerprint sensor whose sensing region overlaps with the target sub-region, and the data acquiring region is the sensing region of the fingerprint sensor.

In a possible implementation manner, when the target sub-region at least partially overlaps with sensing regions of a plurality of fingerprint sensors, the at least one fingerprint sensor is the plurality of fingerprint sensors whose sensing regions overlap with the target sub-region, and the data acquiring region is constituted by parts of the respective sensing regions of the plurality of fingerprint sensors.

In a possible implementation manner, when the target sub-region at least partially overlaps with sensing regions of K adjacent fingerprint sensors, the data acquiring region includes 1/K of each of the sensing regions of the K fingerprint sensors, K≤M.

In a possible implementation manner, the N sub-regions do not overlap with each other.

In a possible implementation manner, the M fingerprint sensors are arranged in a single row or in an array.

In a possible implementation manner, when the M fingerprint sensors are arranged in a single row, the N sub-regions are arranged in a single row, N=2M−1, where the 2i+1-th sub-region covers sensing regions of respective edge portions of two adjacent fingerprint sensors, and the 2i-th sub-region only covers a sensing region of a middle portion of one fingerprint sensor, 1≤i≤(N−1)/2.

In a possible implementation manner, when the M fingerprint sensors include m rows×n columns of fingerprint sensors, the N sub-regions include (m+1) rows×(n+1) columns of sub-regions, where sub-regions in the first and last rows and the first and last columns of the N sub-regions cover a sensing region of an edge portion of one fingerprint sensor or sensing regions of respective edge portions of two fingerprint sensors, and sub-regions other than the sub-regions in the first and last rows and the first and last columns cover sensing regions of respective edge portions of four adjacent fingerprint sensors.

In a third aspect, provided is a terminal device, where the terminal device includes the apparatus for fingerprint identification of the second aspect or any possible implementation manner of the second aspect.

Based on the above technical solutions, when fingerprint identification is performed based on M fingerprint sensors, firstly, a target sub-region is determined among N sub-regions according to pressing information of a finger on a display screen, where N>M, and the N sub-regions cover a fingerprint detecting region constituted by sensing regions of the M fingerprint sensors; secondly, a data acquiring region is determined according to the target sub-region so that fingerprint data captured in the data acquiring region is used for the fingerprint identification. Since the data acquiring region is determined according to the target sub-region, a data amount of the fingerprint data in the data acquiring region could be kept within a proper range by reasonably dividing the N sub-regions, which guarantees a speed of the fingerprint identification. In addition, since the target sub-region is determined according to the pressing information of the finger, the fingerprint data in the data acquiring region determined based on the target sub-region has high reliability, which guarantees performance of the fingerprint identification and improves user experience.

BRIEF DESCRIPTION OF DRAWINGS

FIG. 4 is a schematic diagram of capturing of fingerprint data in all sensing regions.

FIG. 5 is a schematic flowchart of a method for fingerprint identification according to an embodiment of the present application.

DESCRIPTION OF EMBODIMENTS

Technical solutions in the present application will be described hereinafter with reference to the accompanying drawings.

It should be understood that embodiments of the present application may be applied to a fingerprint system, including but not limited to an optical, ultrasonic or other fingerprint identification system and a medical diagnostic product based on optical, ultrasonic or other fingerprint imaging. The embodiments of the present application are only described by an example of an optical fingerprint system, which should not constitute any limitation to the embodiments of the present application, and the embodiments of the present application are also applicable to other systems using an optical, ultrasonic or other imaging technology or the like.

As a common application scenario, an optical fingerprint system provided in an embodiment of the present application may be applied to a smart phone, a tablet computer, and another mobile terminal having a display screen or other electronic devices. More specifically, in the foregoing electronic device, a fingerprint module may be specifically an optical fingerprint module, which may be disposed in a partial region or an entire region under a display screen, thereby forming an under-display or under-screen optical fingerprint system. Alternatively, the optical fingerprint module may be partially or entirely integrated into the interior of the display screen of the electronic device to form an in-display or in-screen optical fingerprint system.

Optical under-screen fingerprint identification technology uses light returned from a top surface of a display component of a device for fingerprint sensing and other sensing operations. The returned light carries information of an object (e.g., a finger) in contact with the top surface, and by capturing and detecting the returned light, a particular optical sensor module under a display screen is implemented. The optical sensor module may be designed to achieve desired optical imaging by properly configuring an optical element for capturing and detecting the returned light.

Figure 1A:
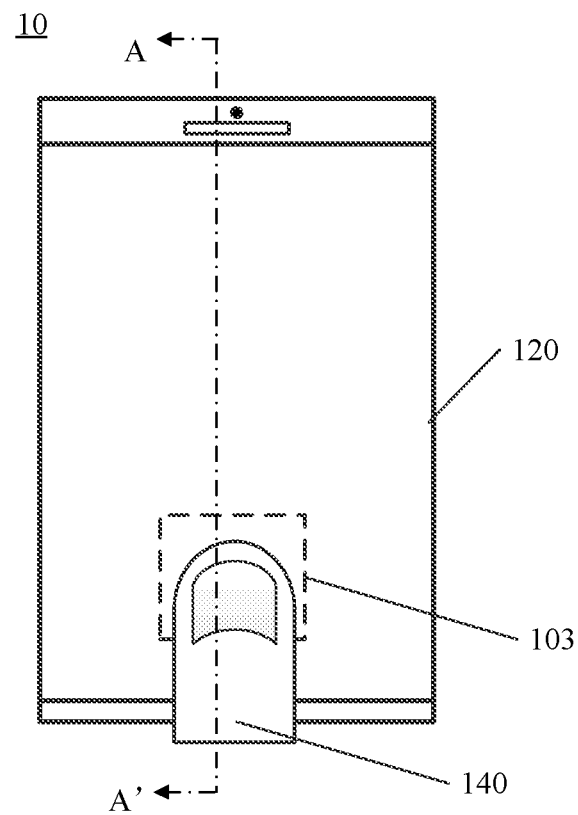
FIG. 1A and FIG. 2A are schematic structural diagrams of electronic devices to which the present application is applicable.
Figure 1B:
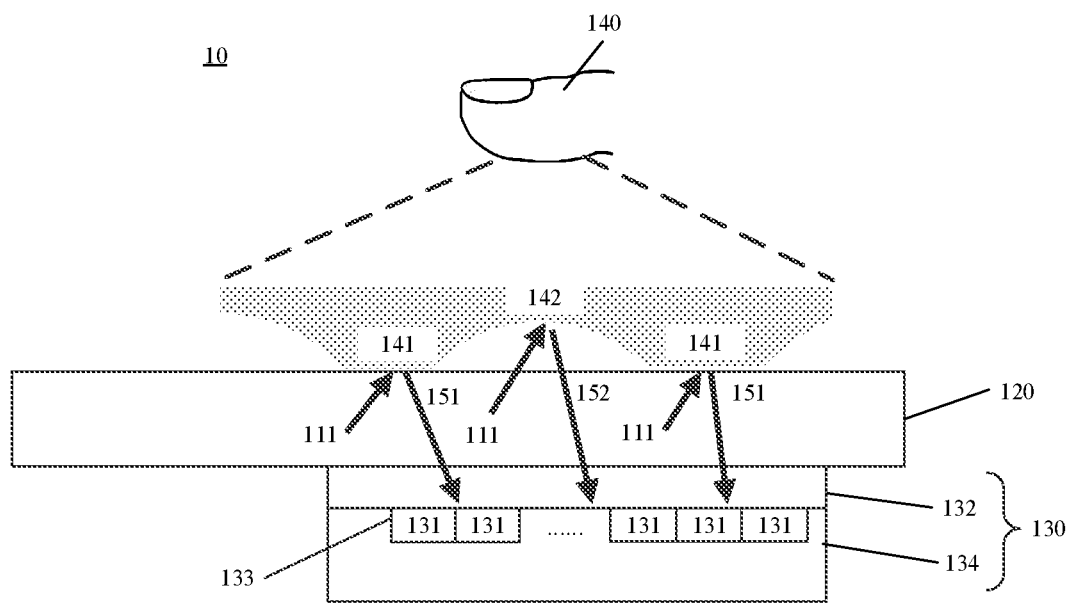
FIG. 1B and FIG. 2B are schematic cross-sectional diagrams of the electronic devices shown in FIG. 1A and FIG. 2A taken along an A-A' direction, respectively.

FIG. 1A and FIG. 1B shows schematic diagrams of an electronic device to which an embodiment of the present application is applicable. FIG. 1A is a schematic oriented diagram of an electronic device 10; and FIG. 1B is a partial schematic cross-sectional diagram of the electronic device 10 shown in FIG. 1A taken along an A-A' direction.

The electronic device 10 includes a display screen 120 and an optical fingerprint module 130. The optical fingerprint module 130 is disposed in a partial region under the display screen 120. The optical fingerprint module 130 includes an optical fingerprint sensor including a sensing array 133 having a plurality of optical sensing units 131. A region where the sensing array 133 is located or a sensing region of the sensing array 133 is a fingerprint detecting region 103 (also referred to as a fingerprint capturing region, a fingerprint identifying region, or the like) of the optical fingerprint module 130. As shown in FIG. 1A, the fingerprint detecting region 103 is located in a display region of the display screen 120. In an alternative embodiment, the optical fingerprint module 130 may also be disposed at another position, such as a side of the display screen 120 or an non-light-transmitting region of an edge of the electronic device 10, and an optical signal from at least part of the display region of the display screen 120 is directed to the optical fingerprint module 130 through a light path design, so that the fingerprint detecting region 103 is actually located in the display region of the display screen 120.

It should be understood that an area of the fingerprint detecting region 103 may be different from an area of the sensing array 133 of the optical fingerprint module 130. For example, the area of the fingerprint detecting region 103 of the optical fingerprint module 130 may be larger than the area of the sensing array 133 of the optical fingerprint module 130 through for example, a lens imaging light path design, a reflective folding light path design or other light path designs such as light convergence or reflection. In other alternative implementation manners, if a light path is directed in a manner of light collimation for example, the area of the fingerprint detecting region 103 of the optical fingerprint module 130 may also be designed to be substantially identical with the area of the sensing array of the optical fingerprint module 130.

Therefore, when a user needs to unlock the electronic device 10 or perform other fingerprint verification, a fingerprint input can be implemented merely by pressing a finger on the fingerprint detecting region 103 in the display screen 120. Since fingerprint detection may be implemented in the screen, there is no need to exclusively reserve space for a front surface of the electronic device 10 in the foregoing structure to set a fingerprint button (such as a Home button), so that a full screen solution may be adopted; that is, the display region of the display screen 120 may be substantially extended to an entire front surface of the electronic device 10.

As an optional implementation manner, as shown in FIG. 1B, the optical fingerprint module 130 includes a light detecting portion 134 and an optical component 132. The light detecting portion 134 includes the sensing array 133, and a readout circuit electrically connected to the sensing array 133 and other auxiliary circuits, and may be fabricated on a die such as on an optical imaging chip or an optical fingerprint sensor by a semiconductor process. The sensing array 133 is specifically a photodetector array including a plurality of photo detectors distributed in an array, and the photo detectors may serve as the optical sensing units as described above. The optical component 132 may be disposed above the sensing array 133 of the light detecting portion 134, and may specifically include a filter layer (Filter), a light directing layer or a light path directing structure, and other optical elements. The filter layer may be used to filter out ambient light penetrating through a finger, and the light directing layer or the light path directing structure is mainly used to direct reflected light reflected from a finger surface to the sensing array 133 for optical detection.

In a specific implementation, the optical component 132 and the light detecting portion 134 may be encapsulated in the same optical fingerprint component. For example, the optical component 132 and the optical detecting portion 134 may be encapsulated in the same optical fingerprint chip, or the optical component 132 may be disposed outside a chip where the light detecting portion 134 is located, for example the optical component 132 is attached above the chip, or some elements of the optical component 132 are integrated into the chip.

The light directing layer or the light path directing structure of the optical component 132 has various implementations, for example, the light directing layer may be specifically a collimator layer fabricated on a semiconductor silicon wafer, which has a plurality of collimating units or micro-hole arrays, and the collimating units may be holes. Light among the reflected light reflected from the finger which is vertically incident to the collimating unit may pass through the collimating unit and be received by the optical sensing unit below it. However, light with an overlarge incident angle is attenuated through multiple reflections inside the collimating unit, and therefore, each optical sensing unit may basically only receive the reflected light reflected from the fingerprint pattern directly above the optical sensing unit, and thus the sensing array 133 may detect a fingerprint image of the finger.

In another implementation manner, the light directing layer or the light path directing structure may also be an optical lens layer having one or more lens units, for example, a lens group composed of one or more aspheric lenses, for converging reflected light reflected from the finger to the sensing array 133 of the light detecting portion 134 below it, so that the sensing array 133 may perform imaging based on the reflected light so as to obtain the fingerprint image of the finger. Optionally, the optical lens layer may be further provided with a pinhole in a light path of the lens unit(s), and the pinhole may cooperate with the optical lens layer to expand a field of view of the optical fingerprint module 130, to improve a fingerprint imaging effect of the optical fingerprint module 130.

In other implementation manners, the light directing layer or the light path directing structure may also specifically adopt a micro-lens layer having a micro-lens array constituted by a plurality of micro-lenses, which may be formed above the sensing array 133 of the light detecting portion 134 by a semiconductor growth process or other processes, and each micro-lens may correspond to one of the sensing units in the sensing array 133, respectively. Moreover, other optical film layers such as a medium layer or a passivation layer, may be included between the micro-lens layer and the sensing unit. More specifically, a light shielding layer (or referred to as a light blocking layer) having a micro-hole may also be included between the micro-lens layer and the sensing unit, where the micro-hole is formed between the corresponding micro-lens and the sensing unit, and the light shielding layer may shield optical interference between the micro-lens and the sensing unit adjacent to each other, such that light corresponding to the sensing unit is converged to the interior of the micro-hole through the micro-lens and is transmitted to the sensing unit via the micro-hole for optical fingerprint imaging.

It should be understood that several implementations of the forgoing light directing layer or the light path directing structure may be used alone or in combination For example, a micro-lens layer may be further disposed above or under the collimator layer or the optical lens layer. Certainly, when the collimator layer or the optical lens layer is used in combination with the micro-lens layer, the specific stacked structure or light path may require to be adjusted according to actual needs.

As an optional implementation manner, the display screen 120 may adopt a display screen having a self-emitting display unit, for example, an organic light-emitting diode (OLED) display screen or a micro light-emitting diode (Micro-LED) display screen. In an example of an OLED display screen, the optical fingerprint module 130 may use a display unit (that is, an OLED light source) of the OLED display screen 120 located in the fingerprint detecting region 103 as an excitation light source for optical fingerprint detection. When a finger 140 is pressed against the fingerprint detecting region 103, the display screen 120 emits a beam of light 111 to the target finger 140 above the fingerprint detecting region 103, and the light 111 is reflected by a surface of the finger 140 to form reflected light or scattered inside the finger 140 to form scattered light. In related patent applications, the reflected light and the scattered light are collectively referred to as reflected light for convenience of description. Since a ridge 141 and a valley 142 of a fingerprint have different light reflecting capabilities, reflected light 151 from the ridge of the fingerprint and reflected light 152 from the valley of the fingerprint have different light intensities. After passing through the optical component 132, the reflected light is received by the sensing array 133 in the optical fingerprint module 130 and converted into a corresponding electrical signal, that is, a fingerprint detecting signal; and fingerprint image data may be obtained based on the fingerprint detecting signal, and fingerprint matching verification may be further performed, thereby implementing an optical fingerprint identification function in the electronic device 10.

In other implementation manners, the optical fingerprint module 130 may also use an internal light source or an external light source to provide an optical signal for fingerprint detection. In this case, the optical fingerprint module 130 may be applied to a non-self-emitting display screen, such as a liquid crystal display screen or other passive light-emitting display screens. As an example, in a case of application to a liquid crystal display screen having a backlight module and a liquid crystal panel, in order to support under-screen fingerprint detection of the liquid crystal display screen, the optical fingerprint system of the electronic device 10 may further include an excitation light source for optical fingerprint detection. The excitation light source may specifically be an infrared light source or a light source of non-visible light at a specific wavelength, which may be disposed under the backlight module of the liquid crystal display screen or disposed in an edge region under a protective cover of the electronic device 10. The optical fingerprint module 130 may be disposed under the liquid crystal panel or the edge region of the protective cover, and light for fingerprint detection may reach the optical fingerprint module 130 by being directed over a light path. Alternatively, the optical fingerprint module 130 may also be disposed under the backlight module, and the backlight module allows the light for fingerprint detection to pass through the liquid crystal panel and the backlight module and reach the optical fingerprint module 130 by providing a hole on film layers such as a diffusion sheet, a brightening sheet, a reflection sheet or the like, or by performing other optical designs. When the optical fingerprint module 130 uses an internal light source or an external light source to provide an optical signal for fingerprint detection, a detection principle is consistent with the foregoing description.

It should be understood that, in a specific implementation, the electronic device 10 further includes a transparent protective cover; and the cover may be a glass cover or a sapphire cover, which is located above the display screen 120 and covers a front surface of the electronic device 10. Therefore, in an embodiment of the present application, the so-called finger being pressed against the display screen 120 actually refers to the finger being pressed against the cover above the display screen 120 or a surface of a protective layer covering the cover.

On the other hand, in some implementation manners, the optical fingerprint module 130 may only include one optical fingerprint sensor, and in this case, the fingerprint detecting region 103 of the optical fingerprint module 130 has a smaller area and a fixed position, and therefore, when an fingerprint input is performed, the user needs to press the finger at a specific position of the fingerprint detecting region 103, otherwise the optical fingerprint module 130 may not be able to capture the fingerprint image, thereby resulting in poor user experience. In other alternative embodiments, the optical fingerprint module 130 may specifically include a plurality of optical fingerprint sensors. The plurality of optical fingerprint sensors may be disposed under the display screen 120 side by side in a splicing manner, and sensing regions of the plurality of optical fingerprint sensors collectively constitute the fingerprint detecting region 103 of the optical fingerprint module 130. Thus the fingerprint detecting region 103 of the optical fingerprint module 130 may extend to a main region of a lower half part of the display screen, that is, to a region generally pressed against by the finger, thereby implementing a blind pressing type of fingerprint input operation. Further, when the number of the optical fingerprint sensors is sufficient, the fingerprint detecting region 103 may also extend to a half of the display region or even the entire display region, thereby achieving half-screen or full-screen fingerprint detection.

Figure 2A:
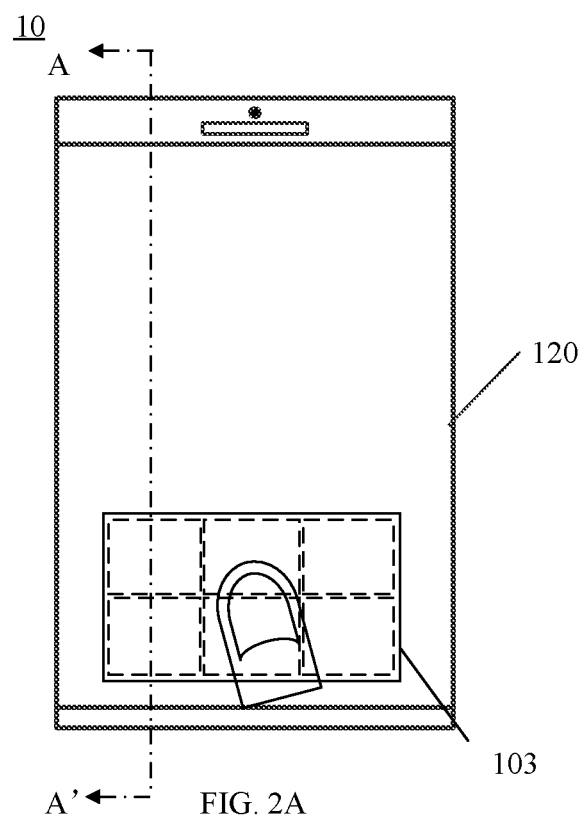
Figure 2B:
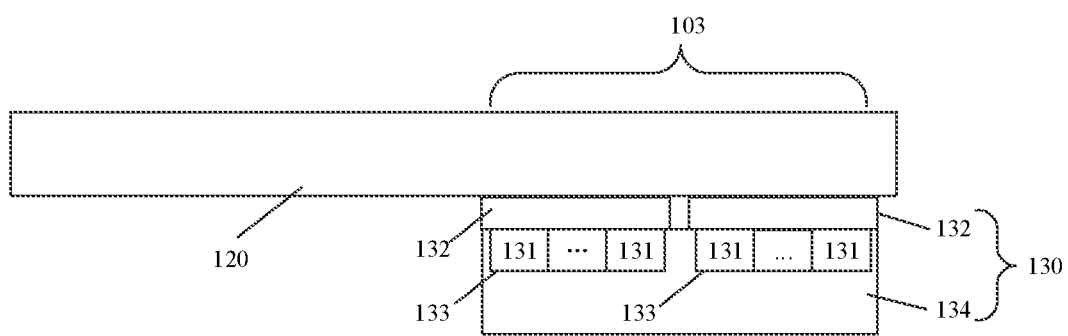

For example, in an electronic device 10 as shown in FIG. 2A and FIG. 2B, when an optical fingerprint module 130 in the electronic device 10 includes a plurality of optical fingerprint sensors, the plurality of optical fingerprint sensors may be disposed under a display screen 120 side by side in a splicing manner or the like for example, and sensing regions of the plurality of optical fingerprint sensors collectively constitute a fingerprint detecting region 103 of the optical fingerprint module 130.

Optionally, corresponding to the plurality of optical fingerprint sensors of the optical fingerprint module 130, an optical component 132 may include a plurality of light path directing structures, and each light path directing structure respectively corresponds to one optical fingerprint sensor and is respectively attached to the above of corresponding optical fingerprint sensor. Alternatively, the plurality of optical fingerprint sensors may also share an entire light path directing structure, that is, the light path directing structure has an area large enough to cover sensing arrays of the plurality of optical fingerprint sensors. In addition, the optical component 132 may also include other optical elements, for example, a filter layer (Filter) or other optical films, which may be disposed between the light path directing structure and the optical fingerprint sensor or between the display screen 120 and the light path directing structure, and are mainly used to isolate the impact of external interference light on optical fingerprint detection. The filter layer may be used to filter out ambient light that penetrates a finger and enters into the optical fingerprint sensor via the display screen 120. Similar to the light path directing structure, the filter layer may be respectively configured for each of the optical fingerprint sensors to filter out interfering light, or a large area of filter layer may be used to cover the plurality of optical fingerprint sensors simultaneously.

The light path modulator may also be replaced by an optical lens, and pinholes may be formed by a light-shielding material above the optical lens to cooperate with the optical lens to converge fingerprint detection light to the optical fingerprint sensors under the optical lens, thereby achieving fingerprint imaging. Similarly, each optical fingerprint sensor may be separately configured with an optical lens for fingerprint imaging, or the plurality of optical fingerprint sensors may also utilize the same optical lens to achieve light convergence and fingerprint imaging. In other alternative embodiments, each of the optical fingerprint sensors may even further have dual sensing arrays (Dual Array) or multiple sensing arrays (Multi-Array), and two or more optical lenses are simultaneously configured to cooperate with the two or more sensing arrays for optical imaging so as to reduce an imaging distance and enhance an imaging effect.

When the plurality of optical fingerprint sensors shown in FIG. 2A and FIG. 2B for example are used for fingerprint identification, due to increase of a fingerprint detecting region of the optical fingerprint apparatus, a data amount of fingerprint data captured each time is greater, and this requires longer time to process the fingerprint data, which affects a speed of the fingerprint identification and thus affects user experience.

Figure 3A:
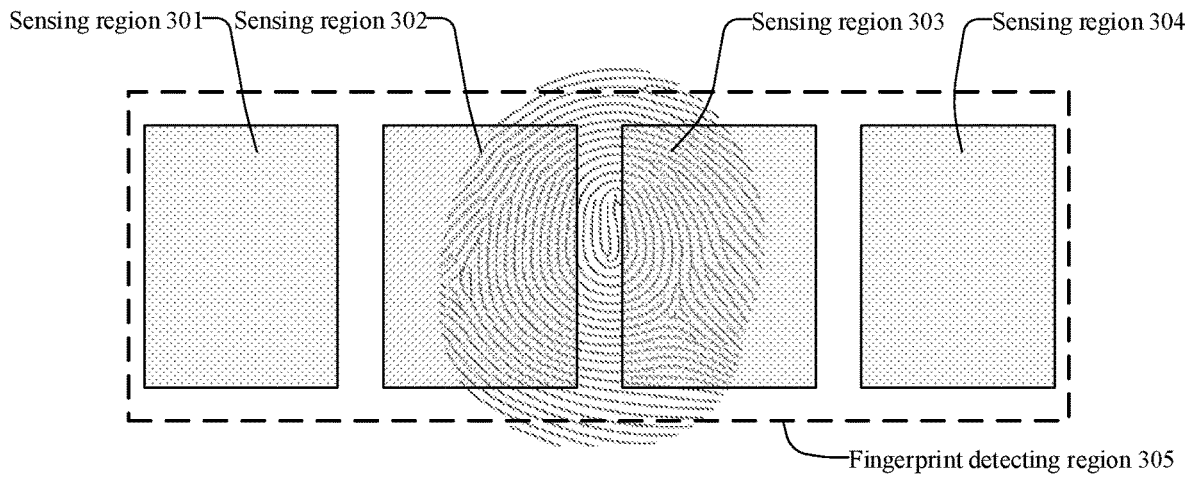
FIG. 3A and FIG. 3B are schematic diagrams of capturing of fingerprint data in all sensing regions.
Figure 3B:
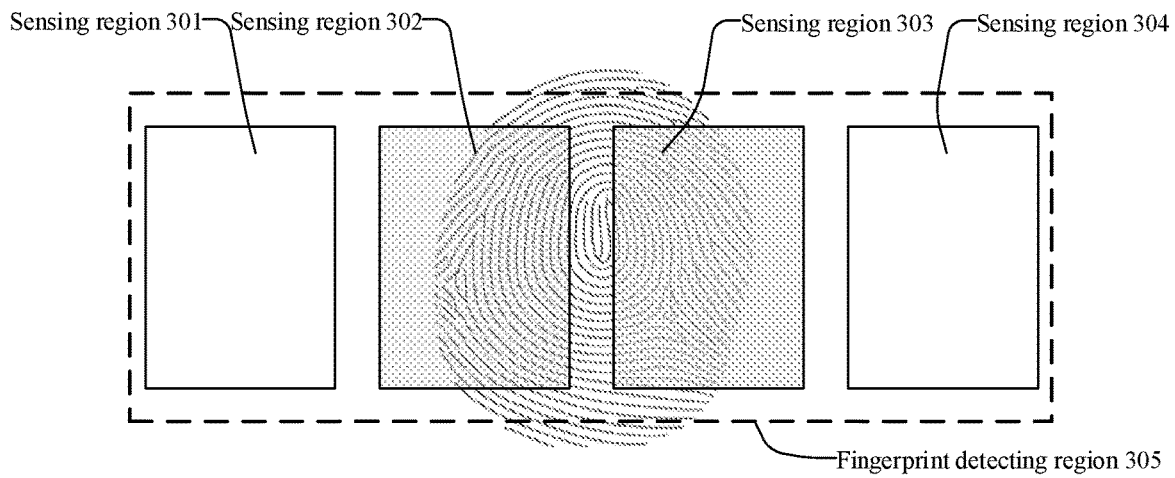
Figure 3C:
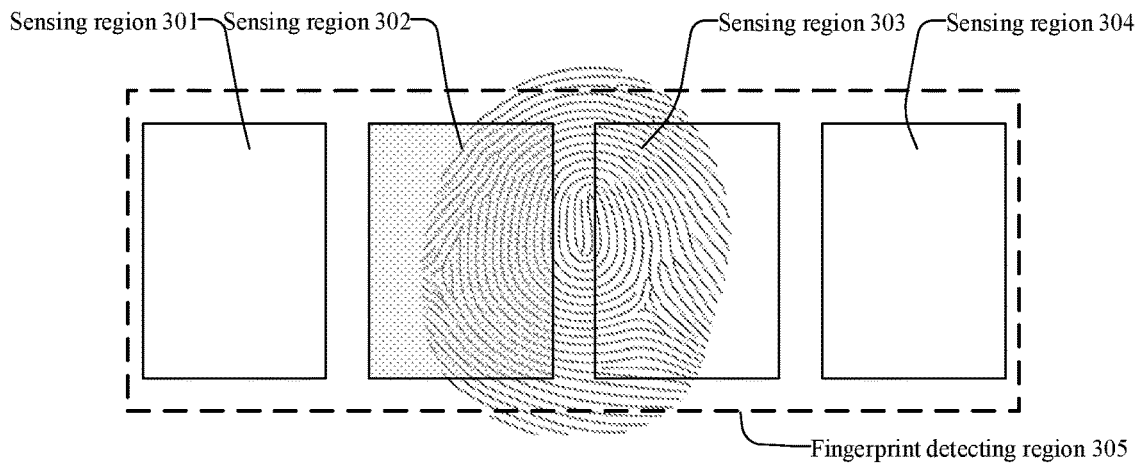
FIG. 3C is a schematic diagram of capturing of fingerprint data in one sensing region.

In an example of a fingerprint identification solution of a plurality of sensors shown in FIG. 3A, FIG. 3B and FIG. 3C, four fingerprint sensors are arranged side by side, and sensing regions of the four fingerprint sensors are a sensing region 301, a sensing region 302, a sensing region 303 and a sensing region 304, respectively. These four sensing regions form a fingerprint detecting region 305 of a device. A pressing region of a finger in the fingerprint detecting region 305 is shown as a fingerprint pattern in FIG. 3A, FIG. 3B and FIG. 3C. It can be seen that the pressing region overlaps with the sensing regions of the second and third fingerprint sensors. In this case, as shown in FIG. 3A, all four fingerprint sensors perform capturing of fingerprint data; or as shown in FIG. 3B, only the second and third fingerprint sensors perform capturing of fingerprint data. No matter which method is adopted, a data amount of the fingerprint data has doubled in comparison to a fingerprint identification solution of a single sensor, so that processing time of the fingerprint data would increase significantly, which affects a speed of fingerprint identification and user experience.

In order to reduce the data amount of the fingerprint data for fingerprint identification, fingerprint data in a sensing region of only one fingerprint sensor may be captured. For example, as shown in FIG. 3C, only the second fingerprint sensor or the third fingerprint sensor may be used to capture fingerprint data in its sensing region so as to reduce the data amount of the fingerprint data. However, it can be seen from the drawing that disadvantages of using this method are: the captured fingerprint data is not the optimal fingerprint data, the fingerprint data captured by the second fingerprint sensor or the third fingerprint sensor includes only a part of the fingerprint data at an edge of the finger, feature points obtained after the fingerprint data is processed are fewer, and performance of the fingerprint identification is affected.

In another example of a fingerprint identification solution of a plurality of sensors shown in FIG. 4, four fingerprint sensors are arranged in a 2×2 array, and sensing regions of the four fingerprint sensors are a sensing region 401, a sensing region 402, a sensing region 403 and a sensing region 404, respectively. These four sensing regions form a fingerprint detecting region 405 of a device. A pressing region of a finger in the fingerprint detecting region 405 is shown as a fingerprint pattern in FIG. 4. It can be seen that the pressing region overlaps with the sensing regions of the four fingerprint sensors. In this case, if the four fingerprint sensors all perform capturing of fingerprint data, a data amount of the fingerprint data increases significantly in comparison to a fingerprint identification solution of a single sensor, and processing time of the fingerprint data would increase significantly, which affects a speed of fingerprint identification and user experience.

If only one of the four fingerprint sensors is used to capture the fingerprint data, the data amount of the fingerprint data may be reduced. However, the captured fingerprint data is not the optimal fingerprint data and includes only a part of fingerprint data at an edge of the finger, feature points obtained after the fingerprint data is processed are fewer, and performance of the fingerprint identification is affected.

In view of this, an embodiment of the present application provides a solution for fingerprint identification. By determining an effective data acquiring region, fingerprint data captured in the data acquiring region is used for fingerprint identification. Therefore, a data amount of the fingerprint data processed in a fingerprint identification process can be kept within a proper range, which improves a speed of fingerprint identification.

It should be understood that each fingerprint sensor in the embodiment of the present application includes a sensing unit array constituted by a plurality of sensing units, which is also referred to as a sensing array for short. An area of a sensing region of the fingerprint sensor may be designed to be substantially the same as a physical area of a sensing array of the fingerprint sensor. For example, in this case, an optical signal may be directed by means of light collimation. The area of the sensing region of the fingerprint sensor may also be designed to be different from the physical area of the sensing array of the fingerprint sensor. For example, a light path is designed through a lens so that the area of the sensing region of the fingerprint sensor is larger than the area of the sensing array of the fingerprint sensor, thereby realizing fingerprint identification of a larger area. A sensing region of each optical fingerprint sensor is located in a display screen so that sensing regions of a plurality of optical fingerprint sensors spliced together collectively form a fingerprint detecting region in the display screen. When fingerprint identification is performed, a finger is pressed in the fingerprint detecting region, an optical signal of light emitted by a light source, illuminating the finger and reflected by the finger, may be directed to an optical fingerprint sensor under the fingerprint detecting region, where each optical fingerprint sensor captures an optical signal from its corresponding sensing region. These optical signals carry fingerprint information of the finger, which is hereinafter referred to as fingerprint data. The fingerprint data is processed using a fingerprint algorithm so as to implement fingerprint identification.

FIG. 5 is a schematic flowchart of a method 500 for fingerprint identification according to an embodiment of the present application. The method shown in FIG. 5 may be executed by a fingerprint module. The fingerprint module includes M fingerprint sensors, where each fingerprint sensor corresponds to one sensing region, and sensing regions of the M fingerprint sensors constitute a fingerprint detecting region.

The M fingerprint sensors may be arranged in a single row or in an array, for example. This array arrangement refers to a fingerprint sensor array with m rows×n columns, and M, m and n are all positive integers greater than 1.

When the fingerprint module is an optical fingerprint module, for related description of the fingerprint module, reference may be made to the foregoing description regarding the optical fingerprint module 130 in FIG. 1A, FIG. 1B, FIG. 2A and FIG. 2B. The M fingerprint sensors are optical fingerprint sensors. For related description, reference may be made to the foregoing description regarding the optical fingerprint sensor in FIG. 1A, FIG. 1B, FIG. 2A and FIG. 2B, which will not be repeated redundantly herein for brevity.

As shown in FIG. 5, the method 500 for fingerprint identification includes the following step:

in 510, acquiring fingerprint data in a data acquiring region.

The data acquiring region is determined according to a target sub-region of N sub-regions, the target sub-region is determined according to pressing information of a finger in the fingerprint detecting region, the N sub-regions cover the fingerprint detecting region, and M and N are positive integers and N>M. The fingerprint data in the data acquiring region is used for fingerprint identification.

A processor may acquire pressing information of a finger in a fingerprint detecting region, a target sub-region is determined among N sub-regions according to the pressing information, and a data acquiring region is determined according to the target sub-regions. At least one fingerprint sensor of M fingerprint sensors performs capturing of fingerprint data and transmits the fingerprint data in the data acquiring region to the processor, and the fingerprint data is processed by the processor and used for fingerprint identification.

The processor may be a processor of an electronic device, such as a main control of a terminal device, or may be a processor of a fingerprint module, such as a built-in microcontroller unit (MCU), which is not limited in the present application.

In this embodiment, the target sub-region may be determined among the N sub-regions according to the pressing information of the finger, and the data acquiring region is determined according to the target sub-region, so as to use the fingerprint data in the data acquiring region for fingerprint identification.

In an implementation manner of 510, the at least one fingerprint sensor may capture all fingerprint data in its respective sensing region, and acquire the fingerprint data in the data acquiring region.

The at least one fingerprint sensor may transmit the fingerprint data in the data acquiring region to a processor, and the fingerprint data is processed by the processor; or the at least one fingerprint sensor transmits all of the captured fingerprint data to a processor, and the processor processes only the fingerprint data in the data acquiring region.

In another implementation manner of 510, the at least one fingerprint sensor may capture only the fingerprint data in the data acquiring region. Thus, the captured fingerprint data in the data acquiring region is transmitted to a processor, and the fingerprint data is processed by the processor.

Optionally, the pressing information includes a center of gravity of pressing of the finger. The target sub-region is a region where the center of gravity of pressing is located.

Generally, if a pressing force of a finger is uniform, a center of gravity of the finger is a geometric center of a pressing region formed by pressing the finger on a display screen, and the pressing region may be, for example, the pressing region shown in FIG. 3A, FIG. 3B, FIG. 3C and FIG. 4. If the pressing force of the finger is not uniform, the position of the center of gravity will deviate from the geometric center, for example, to a side to which a greater pressing force of the finger is applied.

In this embodiment, a sub-region where the center of gravity of pressing of the finger is determined as the target sub-region, thus, the target sub-region is a sub-region with optimal fingerprint data among the N sub-regions, and a better fingerprint identification effect could be achieved by using fingerprint data in the data acquiring region that is determined by the target sub-region for fingerprint identification.

The pressing information is not limited in the embodiment of the present application. Any information related to a press operation of the finger, such as a pressing region, a pressing position, and a pressing force, should fall into the protection scope of the embodiment of the present application. For example, a sub-region having the largest overlapping area with the pressing region is determined as the target sub-region, or a sub-region where the geometric center of the pressing region is located is determined as the target sub-region.

The pressing information may be determined for example, by a touch screen.

The touch screen includes a plurality of touch points, and the touch screen may determine the pressing information of the finger such as a pressing position and a pressing strength according to a signal variation of each touch point in the plurality of touch points The touch screen may be, for example, a capacitive touch screen, and when the finger is pressed against the fingerprint detecting region, the touch screen may determine the pressing information of the finger according to a capacitance variation of each touch point.

Optionally, the N sub-regions include a sub-region that at least partially overlaps with a sensing region of only one fingerprint sensor, and a sub-region that at least partially overlaps with sensing regions of a plurality of fingerprint sensors.

A total area of the N sub-regions may be equal to or slightly larger than an area of the fingerprint detecting region constituted by the sensing regions of the M fingerprint sensors. In this case, since N>M, an area of each sub-region may be less than an area of a sensing region of one fingerprint sensor. Then, the N sub-regions divided based on the fingerprint detecting region may include a sub-region that partially overlaps with a sensing region of only one fingerprint sensor, and a sub-region that partially overlaps with sensing regions of a plurality of fingerprint sensors.

An area of the data acquiring region may be greater than an area of the target sub-region. For example, the area of the data acquiring region is equal to an area of a sensing region of one fingerprint sensor. Generally, in a fingerprint identification solution of a single fingerprint sensor, an area of a sensing region of a single fingerprint sensor is approximate to an area of the pressing region of the finger. As such, when the area of the data acquiring region is equal to the area of the sensing region of one fingerprint sensor, a data amount of fingerprint data used for fingerprint identification each time may be maintained at about a data amount corresponding to one fingerprint sensor, which guarantees that the data amount of the fingerprint data is sufficient for fingerprint identification without increasing a burden of processing the fingerprint data. In addition, since the target sub-region is determined according to the pressing information of the finger, such as the center of gravity of pressing, quality of the fingerprint data in the data acquiring region determined based on the target sub-region is optimal, or the fingerprint data in the data acquiring region is clear, which also guarantees performance of the fingerprint identification.

The N sub-regions may have an equal area.

Alternatively, the N sub-regions may have different areas. For example, an area of a sub-region located at an edge of the fingerprint detecting region in the N sub-regions may be larger, and an area of a sub-region located in a middle of the fingerprint detecting region may be smaller.

In addition, preferably, the N sub-regions do not overlap with each other. Therefore, a case that the center of gravity of pressing is located at an overlapping portion between two sub-regions is avoided.

However, the embodiment of the present application is not limited thereto. If the N sub-regions include two overlapping sub-regions, and the center of gravity of pressing is located exactly at an overlapping portion between the two sub-regions, a sub-region that overlaps more with the pressing region may be determined as the target sub-region for example, or another means may be adopted, for example, one of the two overlapping sub-regions may be selected randomly as the target sub-region.

Optionally, when the target sub-region at least partially overlaps with a sensing region of only one fingerprint sensor, the data acquiring region is the sensing region of the fingerprint sensor. In this case, the at least one fingerprint sensor is the fingerprint sensor whose sensing region overlaps with the target sub-region.

Optionally, when the target sub-region at least partially overlaps with sensing regions of a plurality of fingerprint sensors, the data acquiring region is constituted by parts of the respective sensing regions of the plurality of fingerprint sensors. In this case, the at least one fingerprint sensor is the plurality of fingerprint sensors whose sensing regions overlap with the target sub-region.

For example, when the target sub-region at least partially overlaps with sensing regions of K adjacent fingerprint sensors, the K fingerprint sensors are configured to acquire the fingerprint data in the data acquiring region, and the data acquiring region includes 1/K of each of the sensing regions of the K fingerprint sensors, K≤M. For example, when K=2, there are overlapping portions between the target sub-region and sensing regions of two adjacent fingerprint sensors, and the overlapping portions with the two sensing regions have an equal area, and the data acquiring region includes ½ of each of the sensing regions of the two fingerprint sensors. When K=4, there are overlapping portions between the target sub-region and sensing regions of four adjacent fingerprint sensors, and the overlapping portions with the four sensing regions have an equal area, and the data acquiring region includes ¼ of each of the sensing regions of the four fingerprint sensors.

The division manner of the N sub-regions is not limited in the present application. Information of the N sub-regions for determining a suitable data acquiring region, for example, positions, sizes or number, can all be adjusted according to actual application.

Optionally, when the M fingerprint sensors are arranged in a single row, the N sub-regions are arranged in a single row.

For example, N=2M−1, the 2i+1-th sub-region covers sensing regions of respective edge portions of two adjacent fingerprint sensors, and the 2i-th sub-region only covers a sensing region of a middle portion of one fingerprint sensor, $1 \leq i \leq (N-1)/2$.

Figure 6A:
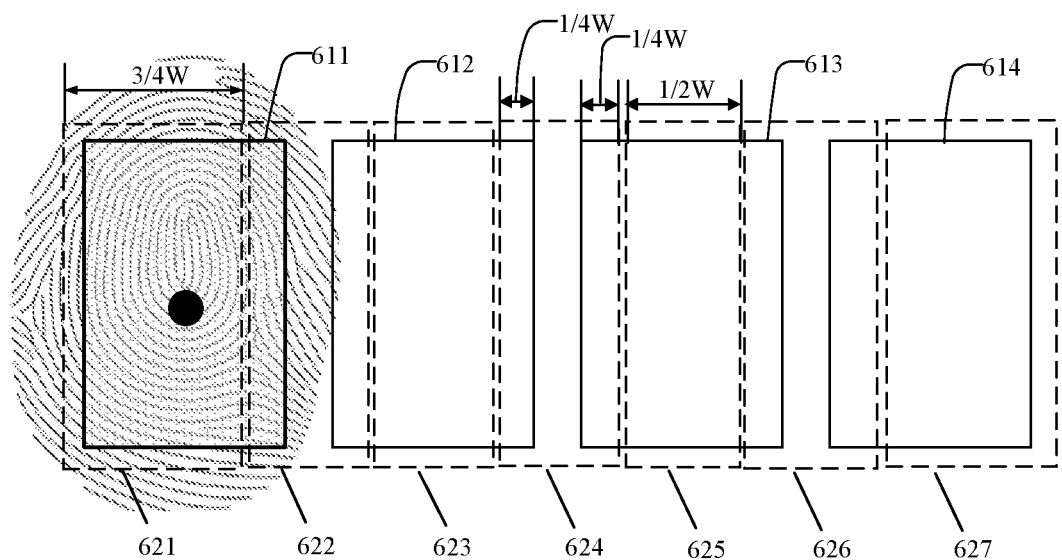
FIG. 6A to FIG. 6D are schematic diagrams of sub-regions and data acquiring regions according to embodiments of the present application.
Figure 6B:
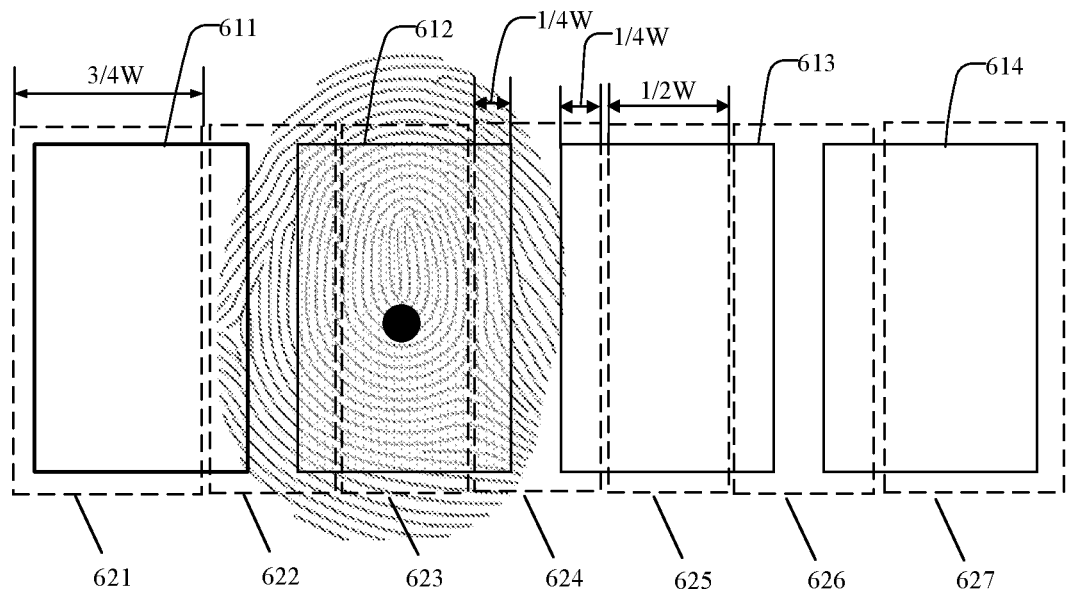

In order to illustrate this division manner of the N sub-regions more clearly, FIG. 6A to FIG. 6B are used as examples for illustration. If M=4, N=2M−1=7. As shown in FIG. 6A to FIG. 6D, four fingerprint sensors are arranged in a single row, a solid line frame represents a sensing region of a fingerprint sensor, and each fingerprint sensor is located under its sensing region. Respective sensing regions of the first to fourth fingerprint sensors from left to right are a sensing region 611, a sensing region 612, a sensing region 613 and a sensing region 614, respectively, the four sensing regions form a fingerprint detecting region of an electronic device, and the fingerprint detecting region may be located in a display region of a display screen. A length of each sensing region is L, and a width thereof is W. A pressing region of a finger is shown as a fingerprint pattern in FIG. 6A to FIG. 6D. Small black dots in FIG. 6A to FIG. 6D indicate a center of gravity of pressing of the finger.

Dotted line frames in FIG. 6A to FIG. 6D show seven sub-regions, which are a sub-region 621, a sub-region 622, a sub-region 623, a sub-region 624, a sub-region 625, a sub-region 626 and a sub-region 627, respectively. As shown in FIG. 6A to FIG. 6D, the sub-region 621 covers the left ¾ of the sensing region 611; the sub-region 622 covers the right ¼ of the sensing region 611 and the left ¼ of the sensing region 612; the sub-region 623 covers the middle ½ of the sensing region 612; the sub-region 624 covers the right ¼ of the sensing region 612 and the left ¼ of the sensing region 613; the sub-region 625 covers the middle ½ of the sensing region 613; the sub-region 626 covers the right ¼ of the sensing region 613 and the left ¼ of the sensing region 614; and the sub-region 627 covers the right ¾ of the sensing region 614.

In FIG. 6A, the center of gravity of pressing of the finger is located in the sub-region 621, and a data acquiring region corresponding to the sub-region 621 is the sensing region 611. Therefore, the first fingerprint sensor captures fingerprint data in its sensing region 611, and a processor may process only the fingerprint data instead of fingerprint data in the entire fingerprint detecting region for fingerprint identification.

In FIG. 6B, the center of gravity of pressing of the finger is located in the sub-region 623, and a data acquiring region corresponding to the sub-region 623 is the sensing region 612. Therefore, the second fingerprint sensor captures fingerprint data in its sensing region 612, and a processor may process only the fingerprint data for fingerprint identification.

Figure 6C:
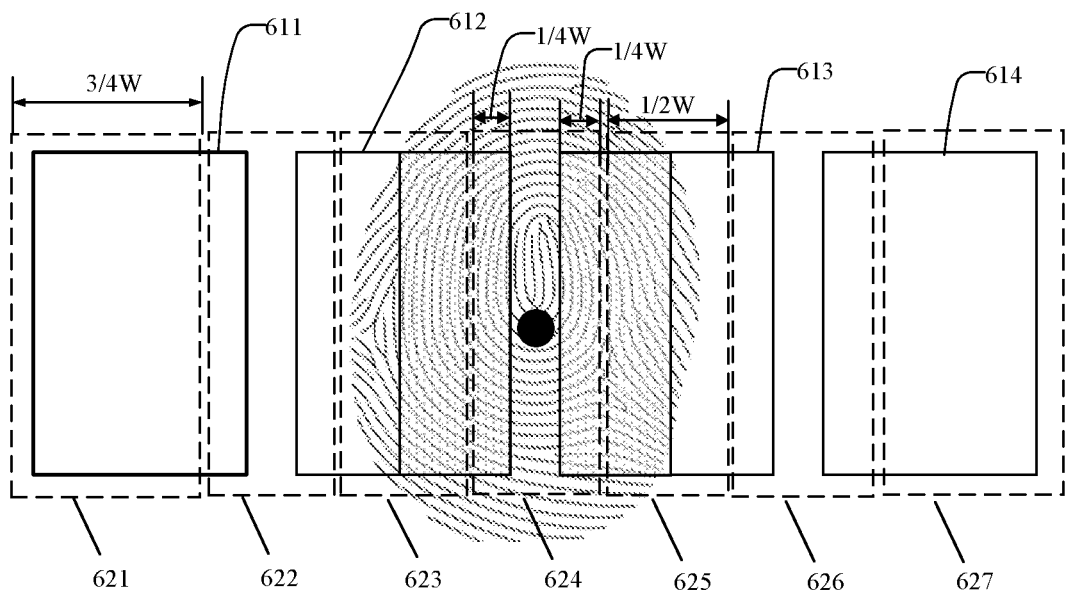

In FIG. 6C, the center of gravity of pressing of the finger is located in the sub-region 624, and a data acquiring region corresponding to the sub-region 624 is the right half of the sensing region 612 and the left half of the sensing region 613. Therefore, the second fingerprint sensor captures fingerprint data in the right half of its sensing region, the third fingerprint sensor captures fingerprint data in the left half of its sensing region, and a processor may process only the fingerprint data in the data acquiring region for fingerprint identification.

Figure 6D:
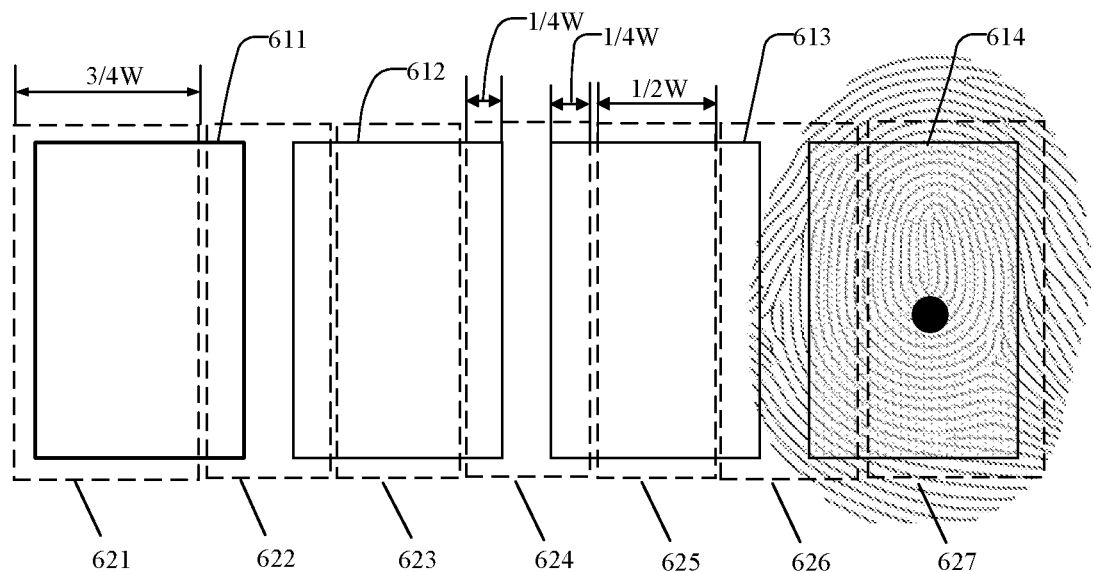

In FIG. 6D, the center of gravity of pressing of the finger is located in the sub-region 627, and a data acquiring region corresponding to the sub-region 627 is the sensing region 614. Therefore, the fourth fingerprint sensor captures fingerprint data in its sensing region 614, and a processor may process only the fingerprint data in the data acquiring region for fingerprint identification.

It can be seen that fingerprint data in a target sub-region determined according to a center of gravity of pressing of a finger is optimal, and a data amount of fingerprint data in a data acquiring region determined according to the target sub-region is maintained at about an amount of fingerprint data corresponding to one fingerprint sensor, which would not increase a burden of data processing.

Optionally, when the M fingerprint sensors include m rows×n columns of fingerprint sensors, the N sub-regions are also distributed in an array.

For example, the N sub-regions include (m+1) rows×(n+1) columns of sub-regions, where sub-regions in the first and last rows and the first and last columns of the N sub-regions cover a part of a sensing region of one fingerprint sensor or cover sensing regions of respective edge portions of two adjacent fingerprint sensors, and sub-regions other than the sub-regions in the first and last rows and the first and last columns cover sensing regions of respective edge portions of four adjacent fingerprint sensors.

In order to illustrate this division manner of the N sub-regions more clearly, FIG. 7A to FIG. 7I are used as examples for illustration. If m=n=2, M=m×n=2×2, N=(m+1)×(n+1)=9. As shown in FIG. 7A to FIG. 7I, four fingerprint sensors are arranged side by side, a solid line frame represents a sensing region of a fingerprint sensor, and each fingerprint sensor is located under its sensing region. A sensing region of a fingerprint sensor in the upper left corner is a sensing region 711, a sensing region of a fingerprint sensor in the upper right corner is a sensing region 712, a sensing region of a fingerprint sensor in the lower left corner is a sensing region 713, and a sensing region of a fingerprint sensor in the lower right corner is a sensing region 714. These four sensing regions form a fingerprint detecting region of an electronic device, and the fingerprint detecting region may be located in a display region of a display screen. A length of each sensing region is L, and a width thereof is W. A pressing region of a finger is shown as a fingerprint pattern in FIG. 7A to FIG. 7I. Small black dots in FIG. 7A to FIG. 7I are a center of gravity of pressing of the finger.

Dotted line frames in FIG. 7A to FIG. 7I show nine sub-regions, which are a sub-region 721, a sub-region 722, a sub-region 723, a sub-region 724, a sub-region 725, a sub-region 726, a sub-region 727, a sub-region 728 and a sub-region 729, respectively. As shown in FIG. 7A to FIG. 7I, the sub-region 721 covers a region in the upper left corner of the sensing region 711; the sub-region 722 covers a region in the upper right corner of the sensing region 711 and a region in the upper left corner of the sensing region 712; the sub-region 723 covers a region in the upper right corner of the sensing region 712; the sub-region 724 covers a region in the lower left corner of the sensing region 711 and a region in the upper left corner of the sensing region 713; the sub-region 725 covers a region in the lower right corner of the sensing region 711, a region in the lower left corner of the sensing region 712, a region in the upper right corner of the sensing region 713 and a region in the upper left corner of the sensing region 714; the sub-region 726 covers a region in the lower right corner of the sensing region 712 and a region in the upper right corner of the sensing region 714; the sub-region 727 covers a region in the lower left corner of the sensing region 713; the sub-region 728 covers a region in the lower right corner of the sensing region 713 and a region in the lower left corner of the sensing region 714; and the sub-region 729 covers a region in the lower right corner of the sensing region 714.

Figure 7A:
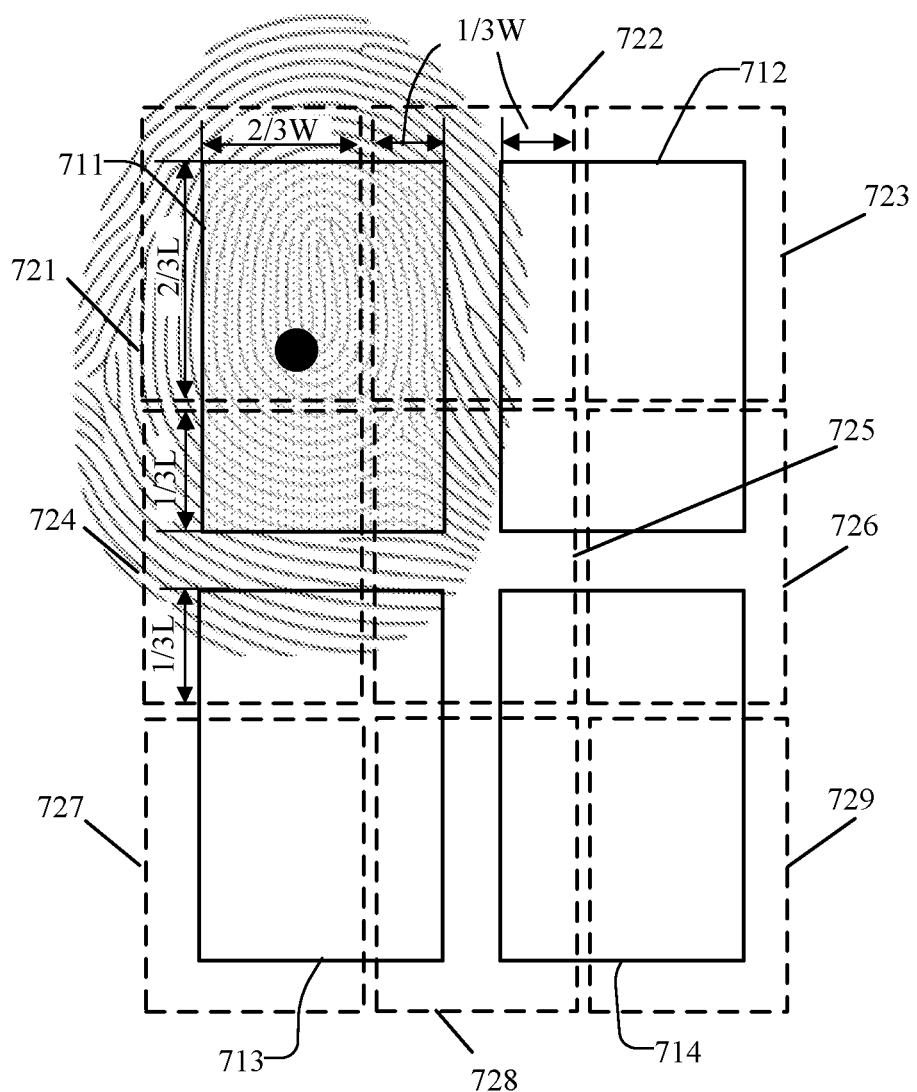
FIG. 7A to FIG. 7I are schematic diagrams of sub-regions and data acquiring regions according to embodiments of the present application.

In FIG. 7A, the center of gravity of pressing of the finger is located in the sub-region 721, and a data acquiring region corresponding to the sub-region 721 is the sensing region 711. Therefore, a fingerprint sensor in the upper left corner captures fingerprint data in its sensing region 711, and a processor may perform data processing on only the fingerprint data in the data acquiring region for fingerprint identification.

Figure 7B:
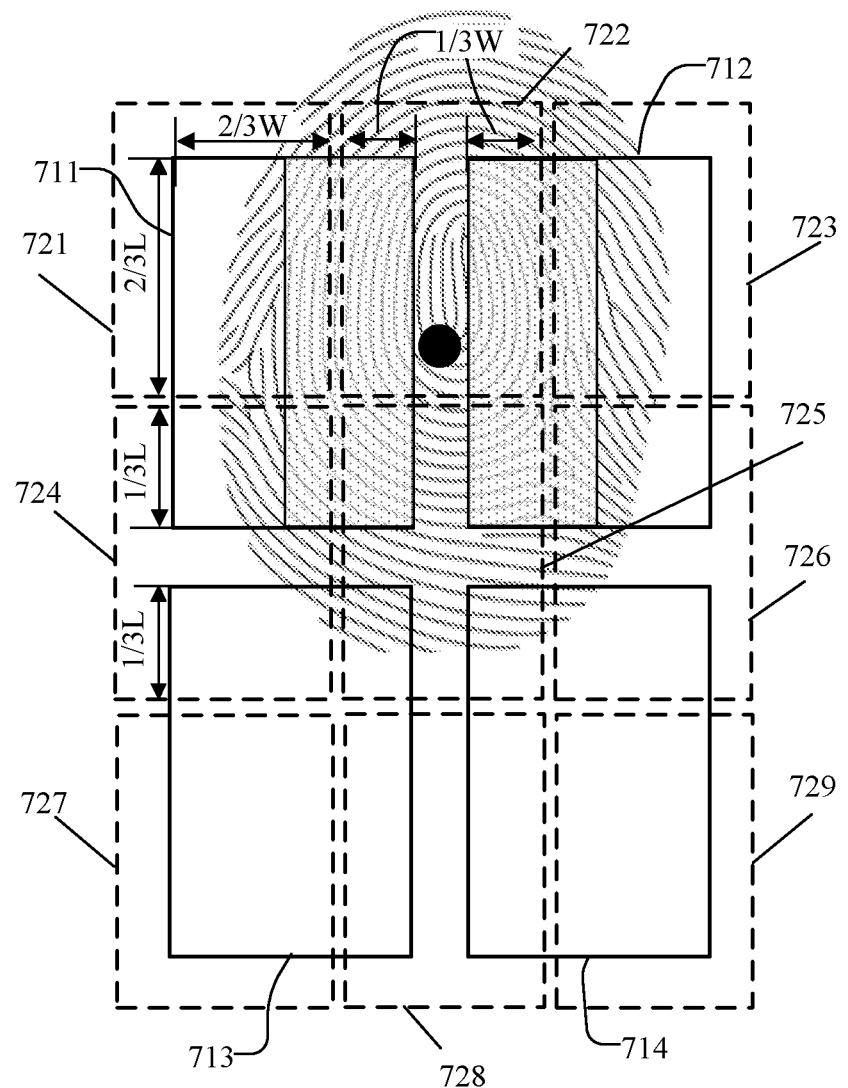

In FIG. 7B, the center of gravity of pressing of the finger is located in the sub-region 722, and a data acquiring region corresponding to the sub-region 722 is the right half of the sensing region 711 and the left half of the sensing region 712. Therefore, a fingerprint sensor in the upper left corner captures fingerprint data in the right half of its sensing region, a fingerprint sensor in the upper right corner captures fingerprint data in the left half of its sensing region, and a processor may perform data processing on only the fingerprint data in the data acquiring region for fingerprint identification.

Figure 7C:
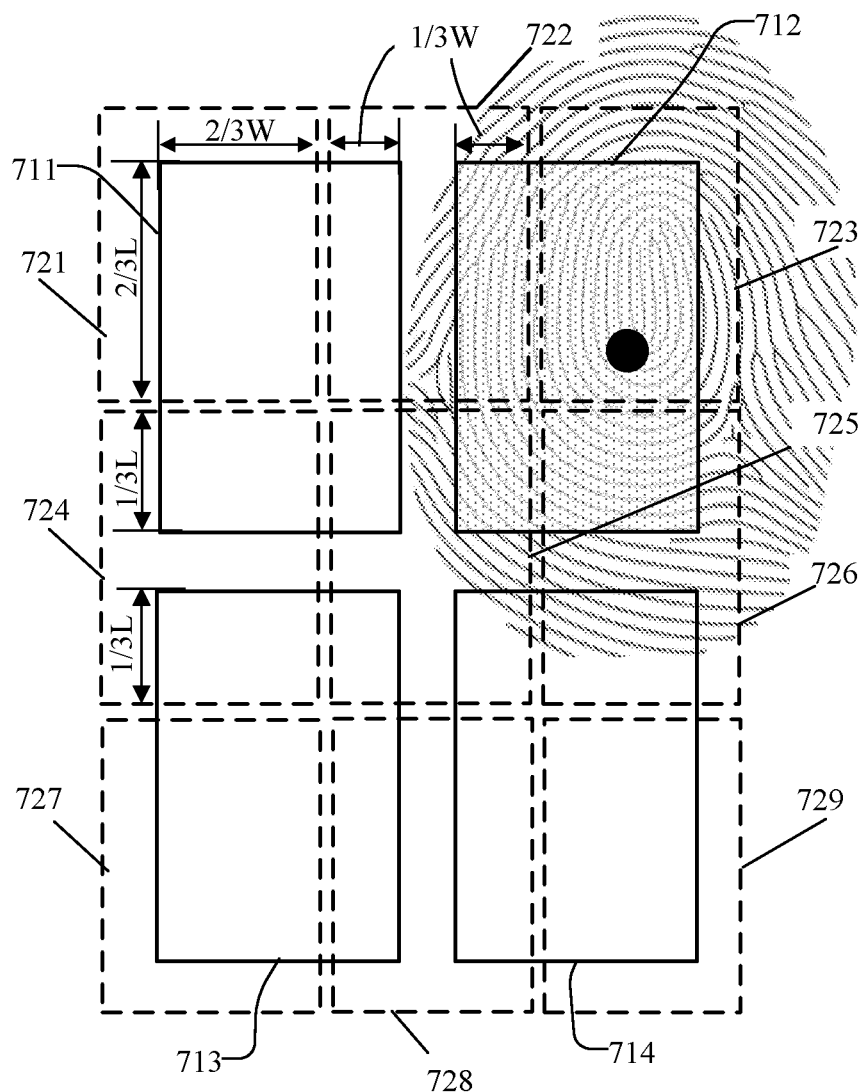

In FIG. 7C, the center of gravity of pressing of the finger is located in the sub-region 723, and a data acquiring region corresponding to the sub-region 723 is the sensing region 712. Therefore, a fingerprint sensor in the upper right corner captures fingerprint data in its sensing region 712, and a processor may perform data processing on only the fingerprint data in the data acquiring region for fingerprint identification.

Figure 7D:
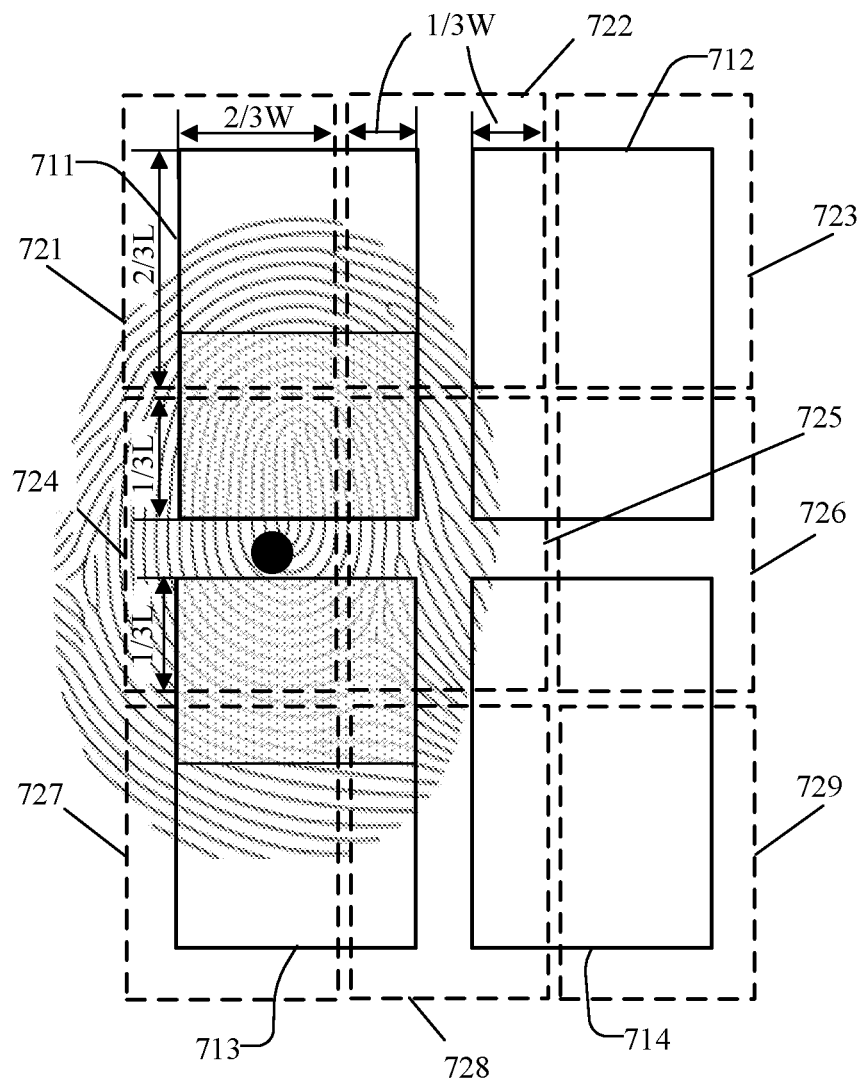

In FIG. 7D, the center of gravity of pressing of the finger is located in the sub-region 724, and a data acquiring region corresponding to the sub-region 724 is the lower half of the sensing region 711 and the upper half of the sensing region 713. Therefore, a fingerprint sensor in the upper left corner captures fingerprint data in the lower half of its sensing region, a fingerprint sensor in the lower left corner captures fingerprint data in the upper half of its sensing region, and a processor may perform data processing on only the fingerprint data in the data acquiring region for fingerprint identification.

Figure 7E:
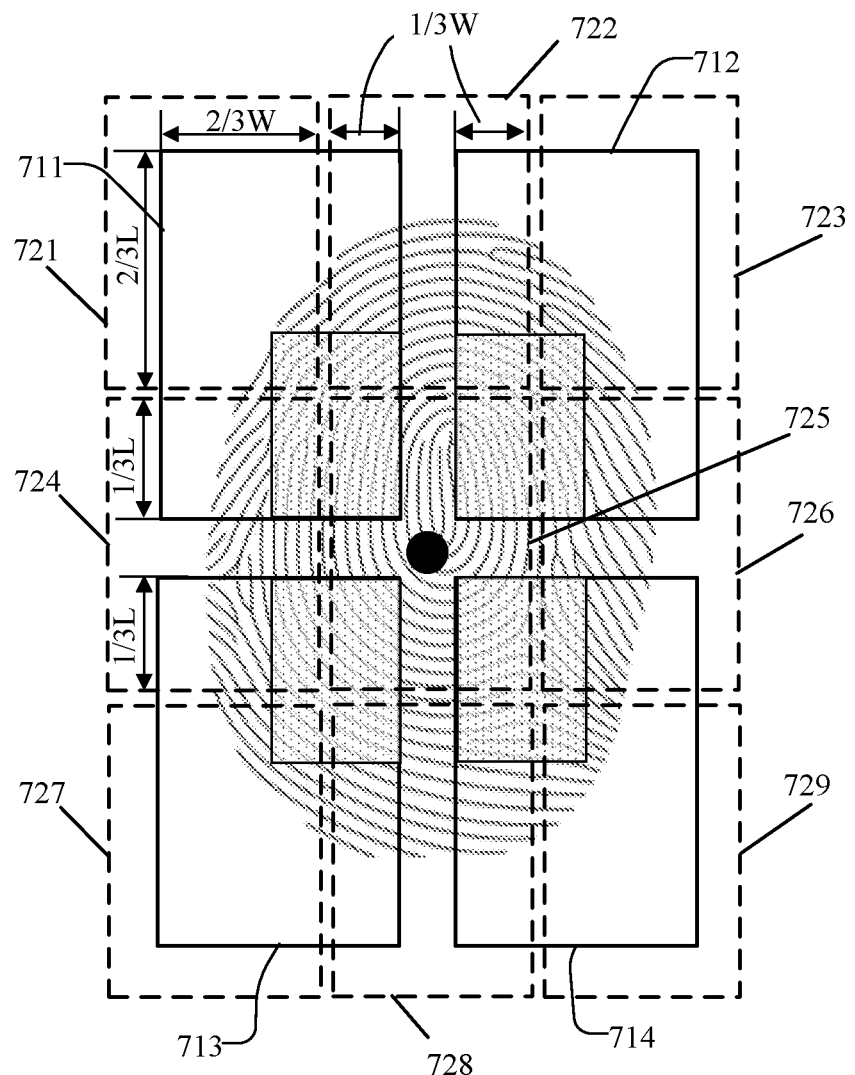

In FIG. 7E, the center of gravity of pressing of the finger is located in the sub-region 725, and a data acquiring region corresponding to the sub-region 725 is a region in the lower right corner of the sensing region 711, a region in the lower left corner of the sensing region 712, a region in the upper right corner of the sensing region 713 and a region in the upper left corner of the sensing region 714. Therefore, a fingerprint sensor in the upper left corner captures fingerprint data in ¼ of its sensing region in the lower right corner, a fingerprint sensor in the upper right corner captures fingerprint data in ¼ of its sensing region in the lower left corner, a fingerprint sensor in the lower left corner captures fingerprint data in ¼ of its sensing region in the upper right corner, and a fingerprint sensor in the lower right corner captures fingerprint data in ¼ of its sensing region in the upper left corner. A processor may perform data processing on only the fingerprint data in the data acquiring region for fingerprint identification.

Figure 7F:
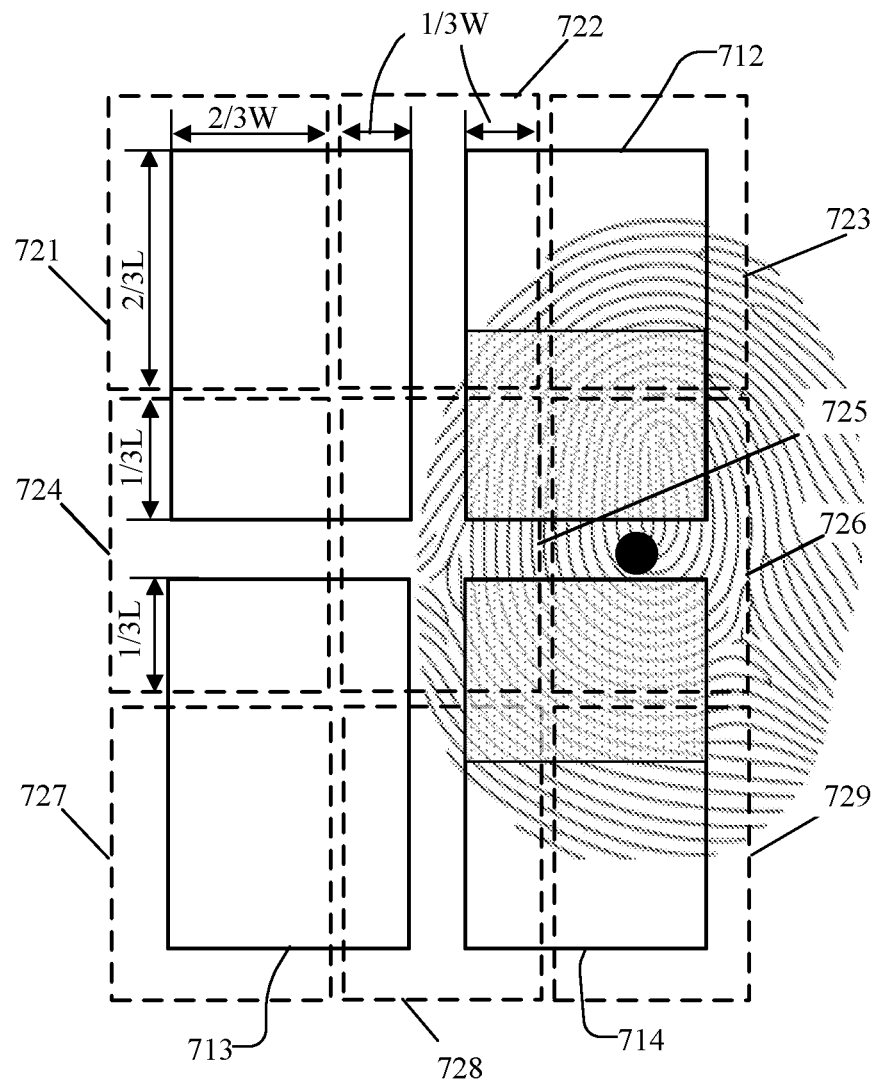

In FIG. 7F, the center of gravity of pressing of the finger is located in the sub-region 726, and a data acquiring region corresponding to the sub-region 726 is the lower half of the sensing region 712 and the upper half of the sensing region 714. Therefore, a fingerprint sensor in the upper right corner captures fingerprint data in the lower half of its sensing region, a fingerprint sensor in the lower right corner captures fingerprint data in the upper half of its sensing region, and a processor may perform data processing on only the fingerprint data in the data acquiring region for fingerprint identification.

Figure 7G:
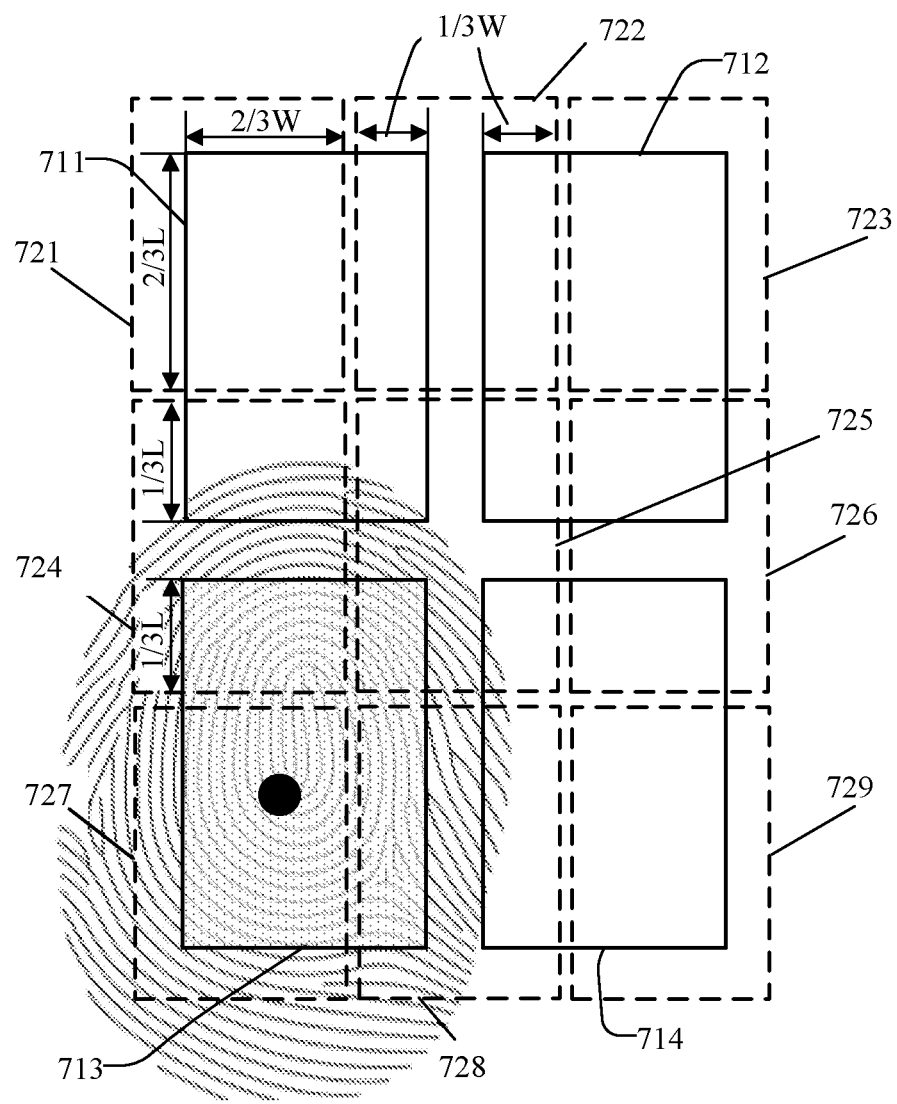

In FIG. 7G, the center of gravity of pressing of the finger is located in the sub-region 727, and a data acquiring region corresponding to the sub-region 727 is the sensing region 713. Therefore, a fingerprint sensor in the lower left corner captures fingerprint data in its sensing region, and a processor may perform data processing on only the fingerprint data in the data acquiring region for fingerprint identification.

Figure 7H:
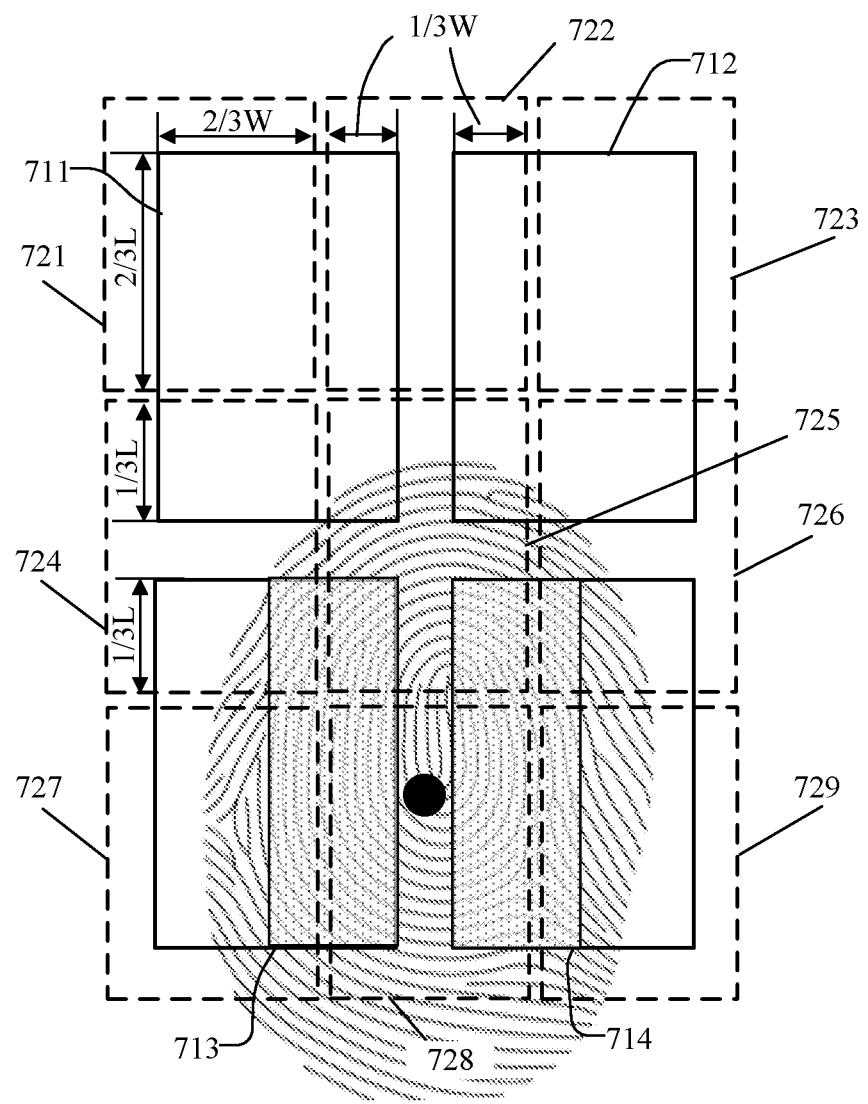

In FIG. 7H, the center of gravity of pressing of the finger is located in the sub-region 728, and a data acquiring region corresponding to the sub-region 728 is the right half of the sensing region 713 and the left half of the sensing region 714. Therefore, a fingerprint sensor in the lower left corner captures fingerprint data in the right half of its sensing region, a fingerprint sensor in the lower right corner captures fingerprint data in the left half of its sensing region, and a processor may perform data processing on only the fingerprint data in the data acquiring region for fingerprint identification.

Figure 7I:
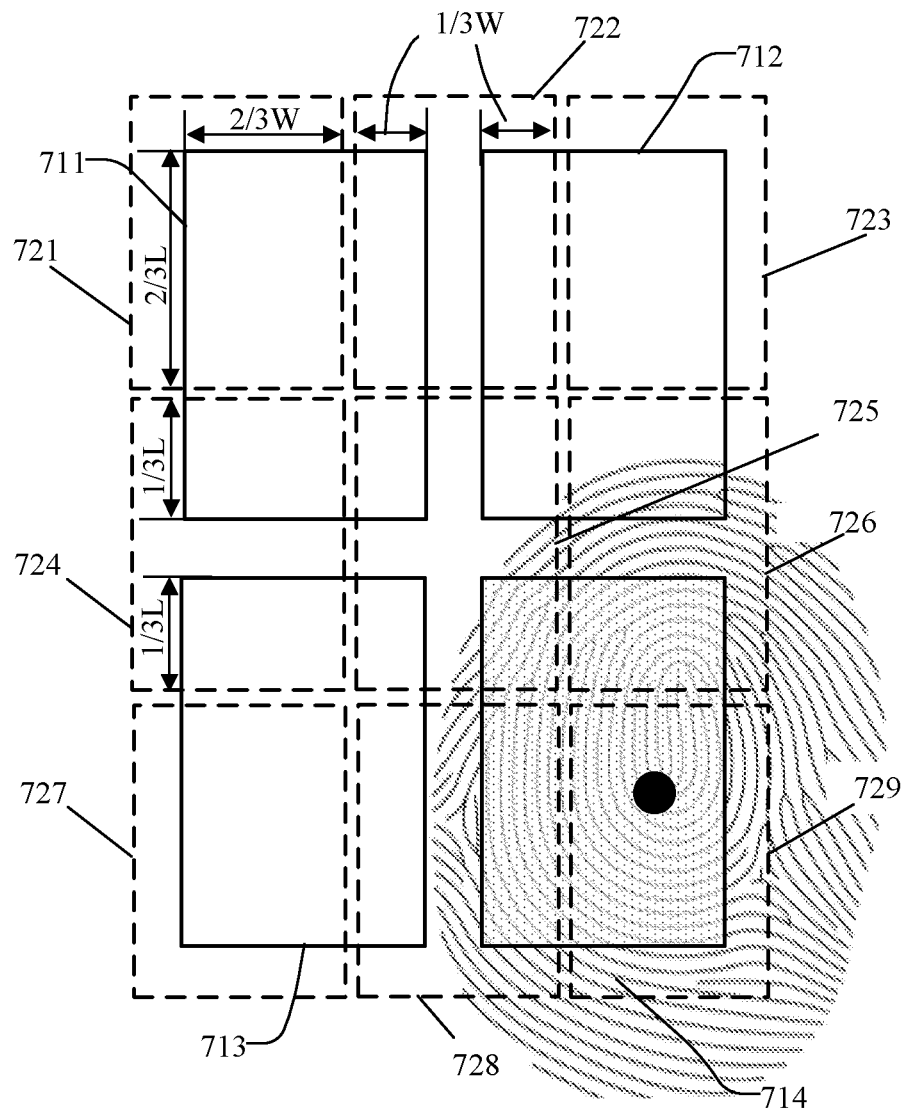

In FIG. 7I, the center of gravity of pressing of the finger is located in the sub-region 729, and a data acquiring region corresponding to the sub-region 729 is the sensing region 714. Therefore, a fingerprint sensor in the lower right corner captures fingerprint data in its sensing region 714, and a processor may perform data processing on only the fingerprint data in the data acquiring region for fingerprint identification.

It can be seen that fingerprint data in a target sub-region determined according to a center of gravity of pressing of a finger is optimal, and a data amount of fingerprint data in a data acquiring region determined according to the target sub-region is maintained at about an amount of fingerprint data corresponding to one fingerprint sensor, which would not increase a burden of data processing.

In the above description, after a data acquiring region is determined, an optical fingerprint sensor captures only fingerprint data in the data acquiring region. That is, an optical sensing unit of the optical fingerprint sensor that corresponds to the data acquiring region performs a capturing operation of fingerprint data, and other optical sensing units of the optical fingerprint sensor do not perform the capturing operation of fingerprint data. For example, as shown in FIG. 6C, a sensing unit in the right half of the second fingerprint sensor performs capturing of fingerprint data, while a sensing unit in the left half does not perform capturing of fingerprint data; and a sensing unit in the left half of the third fingerprint sensor performs capturing of fingerprint data, while a sensing unit in the right half does not perform capturing of fingerprint data. For another example, as shown in FIG. 7D, a sensing unit in the lower half of a fingerprint sensor in the upper left corner performs capturing of fingerprint data, while a sensing unit in the upper half does not perform capturing of fingerprint data; and a sensing unit in the upper half of a fingerprint sensor in the lower left corner performs capturing of fingerprint data, while a sensing unit in the lower half does not perform capturing of fingerprint data. By controlling only those sensing units of an optical fingerprint sensor that are used to capture fingerprint data in a data acquiring region to operate, power consumption of a fingerprint module could be saved.

However, in the embodiments of the present application, after a data acquiring region is determined, an optical fingerprint sensor may also capture all fingerprint data in its sensing region. That is, all optical sensing units in the optical fingerprint sensor perform a capturing operation of fingerprint data. However, when the captured fingerprint data is output to a processor, only fingerprint data in the data acquiring region is output for fingerprint identification. For example, as shown in FIG. 6C, all sensing units of the second fingerprint sensor may perform capturing of fingerprint data, but only fingerprint data captured by the sensing units in the right half is output to the processor for data processing; and all sensing units of the third fingerprint sensor may perform capturing of fingerprint data, but only fingerprint data captured by the sensing units in the left half is output to the processor for data processing. Although the fingerprint sensor captures fingerprint data in the entire sensing region, only the fingerprint data in the data acquiring region is subsequently processed and used for fingerprint identification, which could reduce complexity of implementation.

Therefore, how an optical fingerprint sensor captures fingerprint data is not limited in the embodiments of the present application, as long as a processor can acquire fingerprint data in a data acquiring region, so as to perform data processing on the fingerprint data in the data acquiring region for fingerprint identification.

An embodiment of the present application further provides another possible implementation manner, in which a target sub-region is dynamically determined according to pressing information of a finger instead of dividing N sub-regions in advance, and a data acquiring region is determined according to the target sub-region.

For example, first, a target sub-region may be determined according to pressing information of a finger. For example, the target sub-region may be a geometric region centered on a center of gravity of pressing, a geometric region obtained by fitting according to a pressing region, or the like. A shape and a size of the target sub-region may be preset, for example, to be equal to or less than an area of one sensing region. Next, a data acquiring region may be determined according to the target sub-region in the foregoing manner. For example, when the target sub-region overlaps with only one sensing region, the sensing region is the data acquiring region. For another example, when the target sub-region overlaps with a plurality of sensing regions, respective parts of the plurality of sensing regions constitute the data acquiring region.

Figure 8:
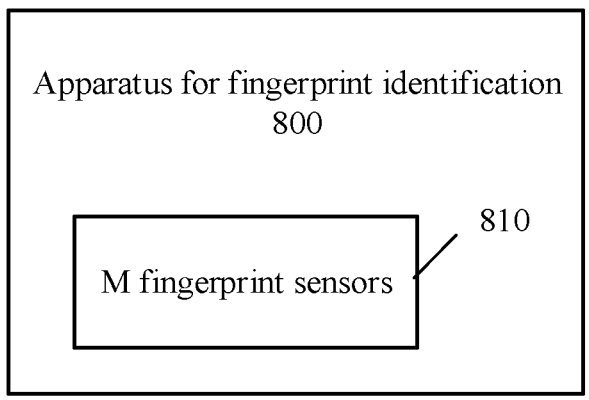
FIG. 8 is a schematic block diagram of an apparatus for fingerprint identification according to an embodiment of the present application.

An embodiment of the present application further provides an apparatus for fingerprint identification. As shown in FIG. 8, an apparatus 800 includes M fingerprint sensors 810, where each fingerprint sensor corresponds to one sensing region, and sensing regions of the M fingerprint sensors constitute a fingerprint detecting region of the apparatus, where at least one fingerprint sensor of the M fingerprint sensors is configured to:

acquire fingerprint data in a data acquiring region, where the data acquiring region is determined according to a target sub-region of N sub-regions, the N sub-regions cover the fingerprint detecting region, M and N are positive integers and N>M, the target sub-region is determined according to pressing information of a finger in the fingerprint detecting region, and the fingerprint data in the data acquiring region is used for fingerprint identification.

Therefore, when fingerprint identification is performed based on M fingerprint sensors, firstly, a target sub-region is determined among N sub-regions according to pressing information of a finger on a display screen, where N>M, and the N sub-regions cover a fingerprint detecting region constituted by sensing regions of the M fingerprint sensors; secondly, a data acquiring region is determined according to the target sub-region so that fingerprint data captured in the data acquiring region is used for the fingerprint identification. Since the data acquiring region is determined according to the target sub-region, a data amount of the fingerprint data in the data acquiring region could be kept within a proper range by reasonably dividing the N sub-regions, which guarantees a speed of the fingerprint identification. In addition, since the target sub-region is determined according to the pressing information of the finger, the fingerprint data in the data acquiring region determined based on the target sub-region has high reliability, which guarantees performance of the fingerprint identification and improves user experience.

Optionally, the N sub-regions include a sub-region that at least partially overlaps with a sensing region of only one fingerprint sensor, and a sub-region that at least partially overlaps with sensing regions of a plurality of fingerprint sensors.

Optionally, the pressing information includes a center of gravity of pressing of the finger, and the target sub-region is a region where the center of gravity of pressing is located.

Optionally, an area of the data acquiring region is equal to an area of a sensing region of one fingerprint sensor.

Optionally, when the target sub-region at least partially overlaps with a sensing region of only one fingerprint sensor, the at least one fingerprint sensor is the fingerprint sensor whose sensing region overlaps with the target sub-region, and the data acquiring region is the sensing region of the fingerprint sensor.

Optionally, when the target sub-region at least partially overlaps with sensing regions of a plurality of fingerprint sensors, the at least one fingerprint sensor is the plurality of fingerprint sensors whose sensing regions overlap with the target sub-region, and the data acquiring region is constituted by parts of the respective sensing regions of the plurality of fingerprint sensors.

Optionally, when the target sub-region at least partially overlaps with sensing regions of K adjacent fingerprint sensors, the data acquiring region includes 1/K of each of the sensing regions of the K fingerprint sensors, K≤M.

Optionally, the N sub-regions do not overlap with each other.

Optionally, the M fingerprint sensors are arranged in a single row or in an array.

Optionally, when the M fingerprint sensors are arranged in a single row, the N sub-regions are arranged in a single row, N=2M−1, where the 2i+1-th sub-region covers sensing regions of respective edge portions of two adjacent fingerprint sensors, and the 2i-th sub-region only covers a sensing region of a middle portion of one fingerprint sensor, 1≤i≤(N−1)/2.

Optionally, when the M fingerprint sensors include m rows×n columns of fingerprint sensors, the N sub-regions include (m+1) rows×(n+1) columns of sub-regions, where sub-regions in the first and last rows and the first and last columns of the N sub-regions cover a sensing region of an edge portion of one fingerprint sensor or sensing regions of respective edge portions of two fingerprint sensors, and sub-regions other than the sub-regions in the first and last rows and the first and last columns cover sensing regions of respective edge portions of four adjacent fingerprint sensors.

It should be understood that the apparatus 800 for fingerprint identification may be used to perform related operations of the foregoing method embodiment. For specific details, reference may be made to the foregoing description of the method 500, which will not be repeated redundantly herein for brevity.

An embodiment of the present application further provides an electronic device, and the electronic device includes the apparatus for fingerprint identification in the foregoing various embodiments of the present application.

Optionally, the electronic device further includes a display screen, and the display screen may be a normal unfolded display screen or a foldable display screen, which is also referred to as a flexible display screen.

By way of example and not limitation, the electronic device in the embodiment of the present application may be portable or mobile computing devices such as a terminal device, a mobile phone, a tablet computer, a notebook computer, a desktop computer, a gaming device, an in-vehicle electronic device or a wearable smart device, and other electronic devices such as an electronic database, an automobile and a bank automated teller machine (ATM). The wearable smart device includes a device that is full-featured and large-sized and can realize complete or partial functions without relying on a smart phone, such as a smart watch or smart glasses, and a device that only focuses on a certain type of application function, and shall be used in cooperation with such other device as a smart phone, such as various types of smart bracelets, smart jewelry and other devices for physical sign monitoring.

It should be understood that the number, size, and arrangement of the fingerprint sensors shown in the embodiments of the present application are only examples, and can be adjusted according to actual needs. For example, the number of the plurality of fingerprint sensors may be two, three, four, five, or the like, and the plurality of the fingerprint sensors may be distributed in a rectangular or circular shape, or the like.

It should be noted that, under a premise of no conflict, various embodiments and/or technical features in the various embodiments described in the present application may be combined with each other arbitrarily, and technical solutions obtained after the combination should also fall within the protection scope of the present application.

It should be understood that the processor of the embodiment of the present application may be an integrated circuit chip with signal processing capability. In an implementation process, steps of the foregoing method embodiment may be completed by using an integrated logical circuit of hardware in the processor or an instruction in a form of software. The foregoing processor may be a general purpose processor, a digital signal processor (DSP), an application specific integrated circuit (ASIC), a field programmable gate array (FPGA) or another programmable logic device, a discrete gate or a transistor logic device, or a discrete hardware component. The methods, the steps, and the logical block diagrams disclosed in the embodiments of the present application can be implemented or executed. The general purpose processor may be a microprocessor or the processor may be any conventional processor or the like. Steps of the methods disclosed in the embodiments of the present application may be directly executed and completed by using a hardware decoding processor, or may be executed and completed by using a combination of hardware and software modules in the decoding processor. The software module may be located in a mature storage medium in the art, such as a random access memory, a flash memory, a read-only memory, a programmable read-only memory, an electrically-erasable programmable memory, or a register. The storage medium is located in a memory, and the processor reads information in the memory and completes the steps of the foregoing method in combination with hardware of the processor.

In addition, a terminal or an electronic device in an embodiment of the present application may further include a memory; the memory may be either volatile memory or nonvolatile memory, or may include both volatile and non-volatile memory. The non-volatile memory may be a read-only memory (ROM), a programmable ROM (PROM), an erasable PROM (EPROM), or an electrically EPROM (EEPROM) or a flash memory. The volatile memory may be a random access memory (RAM) and used as an external cache. By way of example and not limitation, RAMs of many forms are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory in the system and method described in this paper aims to include but is not limited to these memories and any memory of another proper type.

An embodiment of the present application further provides a computer readable storage medium for storing a computer program. The computer program includes instructions that, when executed by an electronic device, cause the electronic device to execute the method in various embodiments of the present application.

An embodiment of the present application further provides a computer program including instructions that, when executed on a computer, cause the computer to execute the method in various embodiments of the present application, which will not be repeated redundantly herein for brevity.

An embodiment of the present application further provides a chip including an input interface, and output interface, a processor and a memory, where the memory is configured to store an instruction, and the processor is configured to call an instruction in the memory so that an electronic device provided with the chip executes the method in various embodiments of the present application, which will not be repeated redundantly herein for brevity.

It should be understood that sequence numbers of the foregoing processes do not mean execution sequences in various embodiments of the present application. The execution sequences of the processes should be determined according to functions and internal logic of the processes, and should not be construed as any limitation on the implementation processes of the embodiments of the present application.

Those of ordinary skill in the art may be aware that, units and algorithm steps of the examples described in the embodiments disclosed herein may be implemented by electronic hardware, or a combination of computer software and electronic hardware. Whether these functions are executed in hardware or software mode depends on the specific applications and design constraint conditions of the technical solution. Those skilled may implement the described functions by using different methods for each specific application, but this implementation should not be considered to be beyond the scope of the present application.

Those skilled in the art to which the present application pertains may clearly understand that, for convenience and simplicity of description, the specific working processes of the system, the apparatus and the units described above may refer to corresponding processes in the foregoing method embodiment, and will not be repeated redundantly herein.

In the several embodiments provided in the present application, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. From another point of view, the displayed or discussed mutual coupling or direct coupling or communication connection may be indirect coupling or communication connection via some interfaces, devices or units, and may be in electrical, mechanical or other forms.

The units described as separate parts may be or may not be separated physically, and a component displayed as a unit may be or may not be a physical unit, namely, may be located in one place, or may be distributed on a plurality of network units. Some or all of the units may be selected to achieve the purposes of the solutions in the present embodiments according to actual needs.

In addition, functional units in various embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the method described in various embodiments of the present application. The foregoing storage medium includes: any medium that can store a program code, such as a USB flash drive, a removable hard disk, a read-only memory (ROM), a random access memory (RAM), a magnetic disk, or an optical disc.

The foregoing descriptions are merely specific embodiments of the present application, but the protection scope of the present application is not limited thereto, persons skilled in the art who are familiar with the art could readily think of variations or substitutions within the technical scope disclosed by the present application, and these variations or substitutions shall all fall within the protection scope of the present application. Therefore, the protection scope of the present application shall be subject to the protection scope of the claims.

What is claimed is:

1. A method for fingerprint identification, wherein the method is applied to an electronic device comprising M fingerprint sensors, each fingerprint sensor corresponds to one sensing region, sensing regions of the M fingerprint sensors constitute a fingerprint detecting region of the electronic device, and the method comprises:

acquiring fingerprint data in a data acquiring region, wherein the data acquiring region is determined according to a target sub-region of N sub-regions, the target sub-region is determined according to pressing information of a finger in the fingerprint detecting region, the N sub-regions cover the fingerprint detecting region, M and N are positive integers and N>M, the N sub-regions comprise a sub-region that at least partially overlaps with a sensing region of only one fingerprint sensor and a sub-region that at least partially overlaps with sensing regions of a plurality of fingerprint sensors, and the fingerprint data in the data acquiring region is used for fingerprint identification.

2. The method according to claim 1, wherein the pressing information comprises a center of gravity of pressing of the finger, and the target sub-region is a region where the center of gravity of pressing is located.

3. The method according to claim 1, wherein an area of the data acquiring region is equal to an area of a sensing region of one fingerprint sensor.

4. The method according to claim 1, wherein when the target sub-region at least partially overlaps with a sensing region of only one fingerprint sensor, at least one fingerprint sensor acquiring the fingerprint data is the fingerprint sensor whose sensing region overlaps with the target sub-region, and the data acquiring region is the sensing region of the fingerprint sensor.

5. The method according to claim 1, wherein when the target sub-region at least partially overlaps with sensing regions of a plurality of fingerprint sensors, at least one fingerprint sensor acquiring the fingerprint data is the plurality of fingerprint sensors whose sensing regions overlap with the target sub-region, and the data acquiring region is constituted by parts of the respective sensing regions of the plurality of fingerprint sensors.

6. The method according to claim 5, wherein when the target sub-region at least partially overlaps with sensing regions of K fingerprint sensors adjacent to each other, the data acquiring region comprises 1/K of each of the sensing regions of the K fingerprint sensors, K≤M.

7. The method according to claim 1, wherein the N sub-regions do not overlap with each other.

8. The method according to claim 1, wherein the M fingerprint sensors are arranged in a single row or in an array.

9. The method according to claim 8, wherein when the M fingerprint sensors are arranged in a single row, the N sub-regions are arranged in a single row, N=2M−1, wherein the 2i+1-th sub-region covers sensing regions of respective edge portions of two adjacent fingerprint sensors, and the 2i-th sub-region only covers a sensing region of a middle portion of one fingerprint sensor, 1≤i≤(N−1)/2.

10. The method according to claim 8, wherein when the M fingerprint sensors comprise m rows×n columns of fingerprint sensors, the N sub-regions comprise (m+1) rows×(n+1) columns of sub-regions, wherein sub-regions in the first and last rows and the first and last columns of the N sub-regions cover a sensing region of an edge portion of one fingerprint sensor or sensing regions of respective edge portions of two adjacent fingerprint sensors, and sub-regions other than the sub-regions in the first and last rows and the first and last columns cover sensing regions of respective edge portions of four fingerprint sensors adjacent to each other.

11. An apparatus for fingerprint identification, wherein the apparatus comprises M fingerprint sensors, each fingerprint sensor corresponds to one sensing region, and sensing regions of the M fingerprint sensors constitute a fingerprint detecting region of the apparatus,
wherein at least one fingerprint sensor of the M fingerprint sensors is configured to acquire fingerprint data in a data acquiring region, wherein the data acquiring region is determined according to a target sub-region of N sub-regions, the target sub-region is determined according to pressing information of a finger in the fingerprint detecting region, the N sub-regions cover the fingerprint detecting region, M and N are positive integers and N>M, the N sub-regions comprise a sub-region that at least partially overlaps with a sensing region of only one fingerprint sensor and a sub-region that at least partially overlaps with sensing regions of a plurality of fingerprint sensors, and the fingerprint data in the data acquiring region is used for fingerprint identification.

12. The apparatus according to claim 11, wherein the pressing information comprises a center of gravity of pressing of the finger, and the target sub-region is a region where the center of gravity of pressing is located.

13. The apparatus according to claim 11, wherein an area of the data acquiring region is equal to an area of a sensing region of one fingerprint sensor.

14. The apparatus according to claim 11, wherein when the target sub-region at least partially overlaps with a sensing region of only one fingerprint sensor, the at least one fingerprint sensor is the fingerprint sensor whose sensing region overlaps with the target sub-region, and the data acquiring region is the sensing region of the fingerprint sensor.

15. The apparatus according to claim 11, wherein when the target sub-region at least partially overlaps with sensing regions of a plurality of fingerprint sensors, the at least one fingerprint sensor is the plurality of fingerprint sensors whose sensing regions overlap with the target sub-region, and the data acquiring region is constituted by parts of the respective sensing regions of the plurality of fingerprint sensors.

16. The apparatus according to claim 15, wherein when the target sub-region at least partially overlaps with sensing regions of K fingerprint sensors adjacent to each other, the data acquiring region comprises 1/K of each of the sensing regions of the K fingerprint sensors, K≤M.

17. The apparatus according to claim 11, wherein the N sub-regions do not overlap with each other, and the M fingerprint sensors are arranged in a single row or in an array.

18. The apparatus according to claim 17, wherein when the M fingerprint sensors are arranged in a single row, the N sub-regions are arranged in a single row, N=2M−1, wherein the 2i+1-th sub-region covers sensing regions of respective edge portions of two adjacent fingerprint sensors, and the 2i-th sub-region only covers a sensing region of a middle portion of one fingerprint sensor, 1≤i≤(N−1)/2.

19. The apparatus according to claim 17, wherein when the M fingerprint sensors comprise m rows×n columns of fingerprint sensors, the N sub-regions comprise (m+1) rows×(n+1) columns of sub-regions, wherein sub-regions in the first and last rows and the first and last columns of the N sub-regions cover a sensing region of an edge portion of one fingerprint sensor or sensing regions of respective edge portions of two fingerprint sensors, and sub-regions other than the sub-regions in the first and last rows and the first and last columns cover sensing regions of respective edge portions of four fingerprint sensors adjacent to each other.

20. An electronic device, wherein the electronic device comprises an apparatus for fingerprint identification, the apparatus comprises M fingerprint sensors, each fingerprint sensor corresponds to one sensing region, and sensing regions of the M fingerprint sensors constitute a fingerprint detecting region of the apparatus, wherein at least one fingerprint sensor of the M fingerprint sensors is configured to acquire fingerprint data in a data acquiring region, wherein the data acquiring region is determined according to a target sub-region of N sub-regions, the target sub-region is determined according to pressing information of a finger in the fingerprint detecting region, the N sub-regions cover the fingerprint detecting region, M and N are positive integers and N>M, the N sub-regions comprise a sub-region that at least partially overlaps with a sensing region of only one fingerprint sensor and a sub-region that at least partially overlaps with sensing regions of a plurality of fingerprint sensors, and the fingerprint data in the data acquiring region is used for fingerprint identification.

* * * * *